United States Patent
Ozawa

(10) Patent No.: US 9,350,764 B2
(45) Date of Patent: *May 24, 2016

(54) GATEWAY APPARATUS AND METHOD AND COMMUNICATION SYSTEM

(75) Inventor: Kazunori Ozawa, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 994 days.

This patent is subject to a terminal disclaimer.

(21) Appl. No.: 13/254,307

(22) PCT Filed: Mar. 11, 2010

(86) PCT No.: PCT/JP2010/054132
§ 371 (c)(1),
(2), (4) Date: Sep. 1, 2011

(87) PCT Pub. No.: WO2010/104154
PCT Pub. Date: Sep. 16, 2010

(65) Prior Publication Data
US 2011/0320192 A1    Dec. 29, 2011

(30) Foreign Application Priority Data

Mar. 13, 2009  (JP) ................................ 2009-061473
Mar. 13, 2009  (JP) ................................ 2009-061474

(51) Int. Cl.
*H04W 80/00* (2009.01)
*G10L 19/00* (2013.01)
(Continued)

(52) U.S. Cl.
CPC .......... *H04L 65/1016* (2013.01); *H04L 65/102* (2013.01); *H04M 7/125* (2013.01); *H04W 88/16* (2013.01)

(58) Field of Classification Search
CPC . H04W 80/00; H04W 52/0225; H04W 84/12; H04L 63/10; H04L 12/5895; H04L 29/06027; H04L 65/1016

USPC ................................................. 370/328, 704
See application file for complete search history.

(56) References Cited

U.S. PATENT DOCUMENTS 7,711,366 B1 *  5/2010  O'Neil .................. H04W 36/30
                                                        370/331
8,437,368 B2 *  5/2013  Krishnamurthi .. H04W 36/0022
                                                        370/466

(Continued)

FOREIGN PATENT DOCUMENTS

JP     2004032319         1/2004
JP     2004222009 A       8/2004

(Continued)

OTHER PUBLICATIONS

Japanese Office Action for JP 2011-503862 mailed on Jun. 4, 2013 with Partial English Translation.

(Continued)

*Primary Examiner* — Chi H Pham
*Assistant Examiner* — Shailendra Kumar
(74) *Attorney, Agent, or Firm* — Hubbs, Enatsky & Inoue PLLC

(57) ABSTRACT

A gateway apparatus receives a call control signal and/or a packet with voice data stored therein in a predetermined protocol from a packet transfer apparatus on a mobile high-speed network and converts the received protocol into a circuit-switched protocol used when an RNC connects to a circuit switching equipment on a mobile circuit-switched network, for output to the circuit switching equipment The gateway apparatus, on receipt of a call process signal and/or a voice signal, from the circuit switching equipment, converts the received protocol for output to the packet transfer apparatus.

16 Claims, 7 Drawing Sheets

(51) Int. Cl.
*H04L 29/06* (2006.01)
*H04M 7/12* (2006.01)
*H04W 88/16* (2009.01)

(56) References Cited

U.S. PATENT DOCUMENTS

| | | | | |
|---|---|---|---|---|
| 2003/0026245 A1* | 2/2003 | Ejzak | ................. | H04L 12/5895 370/352 |
| 2003/0128696 A1* | 7/2003 | Wengrovitz | ...... | H04L 29/06027 370/352 |
| 2004/0005886 A1* | 1/2004 | Oda | ........................ | H04L 63/10 455/422.1 |
| 2008/0198861 A1* | 8/2008 | Makela | ................. | H04W 12/06 370/401 |
| 2009/0323636 A1* | 12/2009 | Dillon | ............... | H04L 29/12188 370/331 |
| 2010/0272096 A1* | 10/2010 | Witzel | ................ | H04L 65/1016 370/352 |

FOREIGN PATENT DOCUMENTS

| | | |
|---|---|---|
| JP | 2005072973 A | 3/2005 |
| JP | 2007524257 A | 8/2007 |
| JP | 2008512958 | 4/2008 |
| JP | 2008210397 A | 9/2008 |
| JP | 2010-517411 A | 5/2010 |
| WO | 2006043318 A | 4/2006 |
| WO | 2007040085 A | 4/2007 |
| WO | 2008/117968 A1 | 10/2008 |

OTHER PUBLICATIONS

International Search Report for PCT/JP2010/054132 mailed May 18, 2010.

* cited by examiner

GATEWAY APPARATUS AND METHOD AND COMMUNICATION SYSTEM

TECHNICAL FIELD

Reference to Related Application

This application is based upon and claims the benefits of the priorities of Japanese patent applications No. 2009-061473 filed on Mar. 13, 2009 and No. 2009-061474 filed on Mar. 13, 2009, the disclosure of which is incorporated herein in its entirety by reference thereto.

The present invention relates to a gateway apparatus, and in particular, to a gateway apparatus and method and a communication system for connecting a packet transfer apparatus provided on a mobile high-speed network and a preset node such as a circuit switching equipment provided on a mobile circuit-switched network to realize interconnection between voice communication on the mobile high-speed network and voice communication on the mobile circuit-switched network. In the present invention, the preset node may be a second gateway apparatus that connects the mobile circuit-switched network and an IMS network. The present invention also relates to a gateway apparatus and method and a communication system for realizing interconnection between voice communication on the mobile high-speed network, voice communication on the mobile circuit-switched network, and voice communication on the IMS network.

BACKGROUND

Currently, mobile phone terminals and mobile networks using the third generation W-CDMA (Code Division Multiple Access) technology and the like use a circuit-switched (CS) system to implement voice telephony. Signals from mobile phones are received by a radio base station and then collected by an RNC (Radio Network Controller). A circuit-switched protocol is used to connect these signals to a circuit switching equipment on a mobile circuit-switched network, thereby implementing a voice telephony service.

The above mobile network uses a circuit-switched (CS) system to implement a voice telephony service. However, in response to a trend toward an IP-based mobile core network, there is a trend of configuring an IMS (IP Multimedia Subsystem) network and introducing a gateway apparatus (referred to as a second gateway apparatus in the detailed description) that interconnects a circuit switching equipment and the IMS network. In this case, a radio base station receives a signal from a mobile phone and an RNC collects the signal received by the radio base station. The RNC connects the signal using a circuit-switched protocol to the above gateway apparatus located at a boundary between a mobile circuit-switched network and the IMS network. Likewise, a terminal on the other side is connected to a gateway apparatus located at the boundary between a mobile circuit-switched network and an IMS network via an RNC. The gateway apparatuses are connected together on an IMS network to implement a voice telephony service.

With research and development of high-speed and large-capacity technology for mobile network, the future trend of mobile network is towards achieving higher speed and larger capacity based on the IP. At the present time, HSDPA (High Speed Downlink Packet Access),
HSPA (High Speed Packet Access),
EVDO Rev. A, and
EVDO Rev. B
have already been put to practical use.

In the future, a further increase in speed is expected, and for example, LTE (Long Term Evolution) and EPC (Evolved Packet Core) are expected to be introduced. LTE aims at 100 and 50 Mbps (megabits per second) or higher in downlink and uplink directions, respectively, and EPC is an IP backbone network supporting LTE.

It is necessary to support voice communication continuously also for terminals which are going to be connected to such LTE and EPC expected to appear in the future.

Whether terminals connected to LTE and EPC need to support a conventional circuit-switched voice communication function or VoIP (Voice over IP) voice communication function is still under debate in the 3GPP (3rd Generation Partnership Project). While no determination has been made yet (at the time of filing of the present application), no matter which functions will be supported, interconnection with existing circuit-switched voice communication needs to be ensured.

Regarding a gateway, for example, Patent Document 1 discloses a gateway for connecting networks of different types. This gateway connects a first network and a second network that uses a signal format different from that of the first network. The gateway comprises: a conversion unit that converts a signal used in the first network into a signal used in the second network and converts a signal used in the second network into a signal used in the first network, when communication is performed between a terminal connected to the first network and a terminal connected to the second network; a detection unit that detects conversion process information including at least one of a conversion time required by the conversion unit to convert the signal and the amount of data converted; and a network connection unit that is connected to at least one of the first and second networks and transmits the conversion process information to a charging system of the first or second network. The conversion unit converts at least one of a call process signal generated by call connection signaling, a voice signal generated by an audio codec, and a video signal generated by a video codec. In the above Patent Document 1, a gateway between an Internet service provider (ISP) network and a 3G network creates information for executing volume charging. Patent Document 1 does not disclose a gateway that causes a packet transfer apparatus provided on a mobile high-speed network to operate like an RNC and connects the packet transfer apparatus to a circuit switching equipment provided on a mobile circuit-switched network, to implement interconnection of voice communication between a terminal connected to a mobile high-speed network and an existing terminal connected to a circuit switching equipment via an RNC.

In addition, Patent Document 2 discloses a multimedia information relay apparatus in which a conversion control means holds an attribute conversion table indicating conversion process contents, if multimedia information entered from a first multimedia communication terminal can be supplied to a second multimedia communication terminal, only through a conversion processing (conversion of attributes such as a coding scheme; a coding rate, and a multiplexing parameter, and the like). A video and audio conversion means of the multimedia information relay apparatus converts video and audio information, respectively, included in the multimedia information entered from the first multimedia communication terminal, in accordance with the contents of conversion processing indicated in the attribute conversion table. After the conversion, the video and audio conversion means supplies the converted information to the second multimedia communication terminal. The relay apparatus disclosed in the above Patent Document 2 converts a coding rate and the like, in accordance with capabilities (video/audio coding and decoding capabilities, for example) between the first and second multimedia communication terminals. However, Patent Document 2 does not disclose a gateway that causes a packet transfer apparatus provided on a mobile high-speed network to operate like an RNC and connects the packet transfer apparatus to a circuit switching equipment on a mobile circuit-switched network, to interconnect voice communication between a terminal connected to the mobile high-speed network and an existing terminal connected to the circuit switching equipment via an RNC.

Patent Document 3 discloses a configuration in which a mobile terminal on a home network is connected to an Internet service provider via an access point and a router. In addition, Patent Document 4 discloses a configuration in which a step that executes dynamic filtering of a data packet at an access gateway in a network, selects a security policy indicated by information inherent to the access gateway. These Patent Documents 3 and 4 do not disclose a gateway that causes a packet transfer apparatus provided on a mobile high-speed network to operate like an RNC and connects the packet transfer apparatus to a circuit switching equipment on a mobile circuit-switched network, to interconnect voice communication between a terminal connected to the mobile high-speed network and an existing terminal connected to the circuit switching equipment via an RNC.

Patent Document 5 discloses a configuration for communication between a fixed terminal on an IPv4 private network and an IPv6 global network interconnected thereto through a relevant IPv4 Internet. According to this configuration, the IPv4 private network (IPv4), the global IPv4 Internet (IN), and the IPv6 network (GV6) are interconnected through a first gateway (AGW) and a second gateway (BGW). In order to allow communication from a first fixed terminal (A1) on the IPv4 private network (PV4) to a second fixed terminal (B) on the IPv6 network (GV6), "IPv6 in IPv4 tunnels" (TUN' and TUN") are set up through the IPv4 private network (PV4) and the global IPv4 Internet (IN). Based on a global IPv6 address assigned to the first dual-stack terminal (A1), mapping tables can be set up in the first gateway (AGW) and the second gateway (BGW). The mapping tables are used for communication between the first terminal (A1) and the second terminal (B). The tunnels (TUN', TUN") are used in particular to avoid use of a Virtual Private Network (VPN) for communication initiated, from the first terminal (A1) to the second terminal (B). Patent Document 5 does not disclose a configuration of the present invention which will be described below.

Patent Document 1:
Japanese Patent Kokai Publication No. JP-P2004-222009A
Patent Document 2:
Japanese Patent Kokai Publication No. JP-P2005-072973A
Patent Document 3:
Japanese Patent Kokai Publication No. JP-P2008-210397A
Patent Document 4:
Japanese Patent Kohyo Publication No. JP-P2008-512958A
Patent Document 5:
Japanese Patent Kohyo Publication No. JP-P2007-524257A

SUMMARY

The following describes analysis made based on the present invention.

In a transition period, that is, until LTE and EPC are in a widespread use, the mobile networks all become IP networks, and the old-type terminals are all replaced with new-type terminals which support LTE and EPC, there coexist both of new-type terminals, each of which is connected to LTE and EPC to execute voice communication, and existing voice terminals, each of which operates by being connected to an RNC (Radio Network Controllers) and a circuit switching equipment on an existing circuit-switched network. Therefore, voice communication on the existing circuit-switched network and voice communication on LTE and EPC need to be interconnected.

However, since a gateway apparatus that enables interconnection between these new and existing terminals do not currently exist, it is difficult to realize voice interconnection, thus posing a major problem in the spread of EPC and LTE.

Accordingly, it is an object of the present invention to provide a gateway apparatus and method and a communication system capable of realizing interconnection of voice communication between a terminal connected to a mobile high-speed network and a terminal connected to a preset node such as a circuit switching equipment via an RNC on a mobile circuit-switched network.

Another object of the present invention is to provide a gateway apparatus and method and a communication system realizing interconnection between a packet transfer apparatus provided on a mobile high-speed network and a preset node such as a gateway apparatus (a second gateway apparatus) that connects a mobile circuit-switched network and an IMS network to realize interconnection between voice communication on the mobile high-speed network, voice communication on the mobile circuit-switched network, and voice communication on the IMS network.

To solve the above problems, the invention disclosed in the present application has a configuration that may be summarized as follows.

According to the present invention, there is provided a gateway apparatus that is connected to a packet transfer apparatus provided on a mobile high-speed network and is connected to a preset node provided on a mobile circuit-switched network to achieve voice communication therebetween, wherein the gateway apparatus receives at least one of a call control signal, and a packet that has voice data stored therein in a predetermined protocol or payload format from the packet transfer apparatus, and converts at least one of: the call control signal, the protocol, and the payload format, if it is decided that conversion thereof is necessary, into a protocol identical to a circuit-switched protocol used when a radio network controller (RNC) connects to the preset node for output to the preset node, and wherein the gateway apparatus receives at least one of: a call process signal using a protocol identical to a protocol used when the preset node outputs data to the radio network controller, and a voice signal stored by using the identical protocol, from the preset node and converts at least one of the protocol of the received call control signal and the protocol of the received voice signal, if it is decided that conversion thereof is necessary, for output to the packet transfer apparatus. According to the present invention, the preset node comprises a circuit switching equipment. According to the present invention, the preset node comprises a second gateway apparatus interconnecting the mobile circuit-switched network and an IMS (IP Multimedia Subsystem) network.

According to the present invention, there is provided a gateway method by a gateway apparatus that is connected to a packet transfer apparatus provided on a mobile high-speed network and is connected to a preset node provided on a mobile circuit-switched network to achieve voice communication therebetween, the method comprising:

receiving at least one of a call control signal using a predetermined protocol, and a packet that has voice data stored therein in a predetermined protocol or payload format from the packet transfer apparatus;

converting at least one of the protocol of the call control signal, the protocol of the packet, and the payload format of the packet, if it is decided that conversion thereof is necessary, into a protocol identical to a circuit-switched protocol used when a radio network controller (RNC) connects to the preset node for output to the preset node on the mobile circuit-switched network;

receiving at least one of a call process signal using a protocol identical to a protocol used when the preset node outputs data to the radio network controller and a voice signal stored by using the identical protocol, from said preset node; and converting at least one of the protocol of the received call control signal and the protocol of the received voice signal, it is decided that conversion thereof is necessary, for output to the packet transfer apparatus. According to the present invention, the preset node comprises a circuit switching equipment. According to the present invention, the preset node comprises a second gateway apparatus interconnecting the mobile circuit-switched network and an IMS (IP Multimedia Subsystem) network.

According to the present invention, there is provided a program, causing a computer forming a gateway apparatus, which is connected to a packet transfer apparatus provided on a mobile high-speed network and is connected to a preset node provided on a mobile circuit-switched network to achieve voice communication therebetween, to execute the processing comprising:

receiving at least one of a call control signal, and a packet that has voice data stored therein in a predetermined protocol or payload format from the packet transfer apparatus on the mobile high-speed network;

converting at least one of the call control signal, the protocol, and the payload format, if it is decided that conversion thereof is necessary, into a protocol identical to a circuit-switched protocol used when a radio network controller (RNC) on the mobile circuit-switched network connects to the preset node for output to the preset node;

receiving at least one of a call process signal using a protocol identical to a protocol used when the preset node outputs data to the radio network controller, and a voice signal stored by using the identical protocol, from said preset node; and converting, if it is decided that conversion of at least one of the protocol of the received call control signal and the protocol of the received voice signal, is necessary, at least one of the protocol of the call control signal and the protocol of the voice signal, for output to the packet transfer apparatus on the mobile high-speed network. According to the present invention, there is provided a computer readable medium storing the program. According to the present invention, the preset node comprises a circuit switching equipment. According to the present invention, the preset node comprises a second gateway apparatus interconnecting the mobile circuit-switched network and an IMS (IP Multimedia Subsystem) network.

According to the present invention, there is provided a communication system, comprising:

a packet transfer apparatus provided on a mobile high-speed network;

a preset node provided on a mobile circuit-switched network; and a gateway apparatus that is connected to the packet transfer apparatus and is connected to a preset node to achieve voice communication therebetween, wherein the gateway apparatus receives at least one of a call control signal, and a packet that has voice data stored therein in a predetermined protocol or payload format from the packet transfer apparatus on the mobile high-speed network, and converts at least one of: the call control signal, the protocol, and the payload format, if it is decided that conversion thereof is necessary, into a protocol identical to a circuit-switched protocol used when a radio network controller (RNC) on the mobile circuit-switched network connects to the preset node for output to the preset node, and wherein the gateway apparatus receives at least one of a call process signal using a protocol identical to a protocol used when the preset node outputs data to the radio network controller, and a voice signal stored by using the identical protocol, from preset node, and converts, if it is decided that at least one of the protocol of the received call control signal and the protocol of the received voice signal needs to be converted, at least one of the protocol of the call control signal and the protocol of the voice signal, for output to the packet transfer apparatus on the mobile high-speed network. According to the present invention, the preset node comprises a circuit switching equipment. According to the present invention, the preset node comprises a second gateway apparatus interconnecting the mobile circuit-switched network and an IMS (IP Multimedia Subsystem) network.

According to the present invention, it is possible to realize interconnection of voice communication between a terminal connected to a mobile high-speed network and a terminal connected to a circuit switching equipment via an RNC on a mobile circuit-switched network.

In addition, according to the present invention, it is possible to realize interconnection between a packet transfer apparatus provided on a mobile high-speed network and a gateway apparatus (a second gateway apparatus) connecting a mobile circuit-switched network and an IMS network to realize interconnection between voice communication on the mobile high-speed network, voice communication on the mobile circuit-switched network, and voice communication on the IMS network.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Preferred modes and exemplary embodiments of the present invention will be described.

First Mode

In one of the preferred modes of the present invention, a gateway apparatus causes a packet transfer apparatus connected to LTE and EPC on a mobile high-speed network to operate like an RNC and to connect to a circuit switching equipment on a mobile circuit-switched network, thereby realizing interconnection of voice communication between a terminal connected to LTE and EPC on the mobile high-speed network and a terminal (an existing terminal, for example) connected to the circuit switching equipment via an RNC.

In one of the preferred modes of the present invention, a gateway apparatus (110 in FIG. 1) receives at least one of a call control signal using a protocol determined by LTE and EPC and a packet that has voice data stored therein in a predetermined protocol or payload format from a packet transfer apparatus (139 in FIG. 1) connected to LTE and EPC, on an LTE and EPC bearer. The gateway apparatus (110 in FIG. 1) converts at least one of the protocol of the call control signal and the protocol or payload format of the packet into a mobile circuit-switched protocol, for output to a circuit switching equipment (135 in FIG. 1) on a mobile circuit-switched network.

In one of the preferred modes of the present invention, the gateway apparatus (110 in FIG. 1) receives at least one of a call process signal and a voice signal using a circuit-switched protocol from the circuit switching equipment (135 in FIG. 1) on a mobile circuit-switched network. The gateway apparatus converts at least one of the protocols of the inputted call process signal and voice signal into an LTE and EPC bearer protocol, for output to the packet transfer apparatus (139 in FIG. 1) which is connected to LTE and EPC.

In one of the preferred modes of the present invention, a call control signal between a gateway apparatus (110 in FIG. 1) and a packet transfer apparatus (139 in FIG. 1) which is connected to LTE and EPC can be transferred in one of the following two modes:

(A) a circuit-switched call control signal without change is transferred on an LTE and EPC bearer; and
(B) using SIP (Session Initiation Protocol) used in VoIP, a call control signal is transferred on an LTE and EPC bearer. In the following example, the description will be made based on (A).

In one of the preferred modes of the present invention, a voice signal between the gateway apparatus and the packet transfer apparatus can be transferred in one of the following two modes:

(C) using IuUP (Iu U-Plane), which is a circuit-switched protocol, without change, a voice signal is transferred on an LTE and EPC bearer; and
(D) Using RTP (Realtime Transport Protocol) used in VoIP, a voice signal is transferred on an LTE and EPC bearer. In the following example, the description will be made based on (D). Hereinafter, Exemplary Embodiments will be described based on specific examples.

Exemplary Embodiment 1

Figure 1:
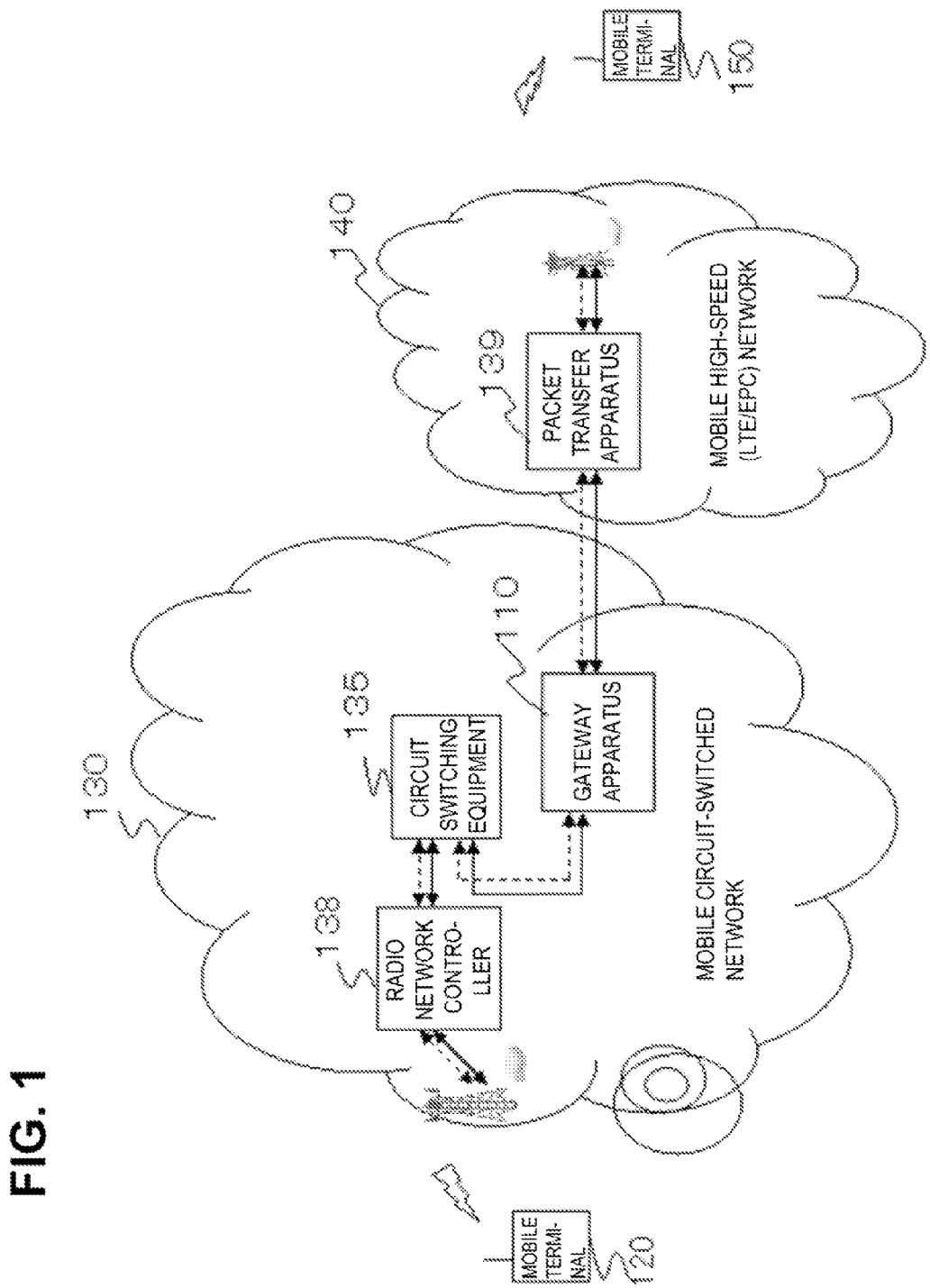
FIG. 1 is a diagram showing a network configuration and a connection mode according to a first exemplary embodiment of the present invention.

FIG. 1 illustrates a network configuration and a connection mode of a gateway apparatus according to a first exemplary embodiment of the present invention. In FIG. 1, a mobile terminal 120 is a voice telephone terminal connected to an existing mobile circuit-switched network 130. While not particularly limited thereto, an existing voice telephone terminal can be used without change as the mobile terminal 120. The mobile terminal 120 is connected to the mobile circuit-switched network 130 and exchanges a call control signal and a voice signal with a circuit switching equipment 135 via a radio network controller (RNC) 138. For example, the mobile terminal 120 includes, as an audio codec, an AMR (Adaptive Multi-Rate) audio codec and transmits/receives a bit stream obtained by compression-encoding a voice signal at a bit rate of 12.2 kbps. As for details of the AMR audio codec, reference can be made to 3GPP (Third Generation Partnership Project) TS 26.090 specifications, and so forth.

The circuit switching equipment 135 exchanges a call process signal such as ISUP (Integrated Services Digital Network User Part) used in the mobile circuit-switched network with the mobile terminal 120, and exchanges an AMR stream as voice data with the mobile terminal 120.

A gateway apparatus 110 converts a protocol outputted from (inputted to) a packet transfer apparatus 139 into a protocol identical to that outputted from (inputted to) the RNC 138, so that the packet transfer apparatus 139 on a mobile high-speed network 140 using LTE, EPC, and the like (also referred to as a mobile LTE/EPC network) looks like to operates in the same way as the radio network controller (RNC) 138, from the view point of the circuit switching equipment 135 on the mobile circuit-switched network 130 and after the conversion, the gateway apparatus 110 connects the packet transfer apparatus 139 to the circuit switching equipment 135. In this way, the gateway apparatus 110 interconnects circuit-switched voice communication from the mobile terminal 120 and LTE and EPC voice communication from a mobile terminal 150.

In the present embodiment, for example, at least one of an S-GW (Serving GateWay) and a P-GW (Packet Data GateWay) may be used as the packet transfer apparatus 139 on LTE and EPC. Namely, the gateway apparatus 110 communicates with the circuit switching equipment 135 by using, for example, an ISUP protocol as a call control signal; and
a format in which an AMR audio stream is stored in an IuUP (Iu User Plane) circuit-switched protocol as a voice signal. Regarding the IuUP protocol, reference can be made to 3GPP TS 25.415 specifications, TS 26.102, and the like.

Figure 2:
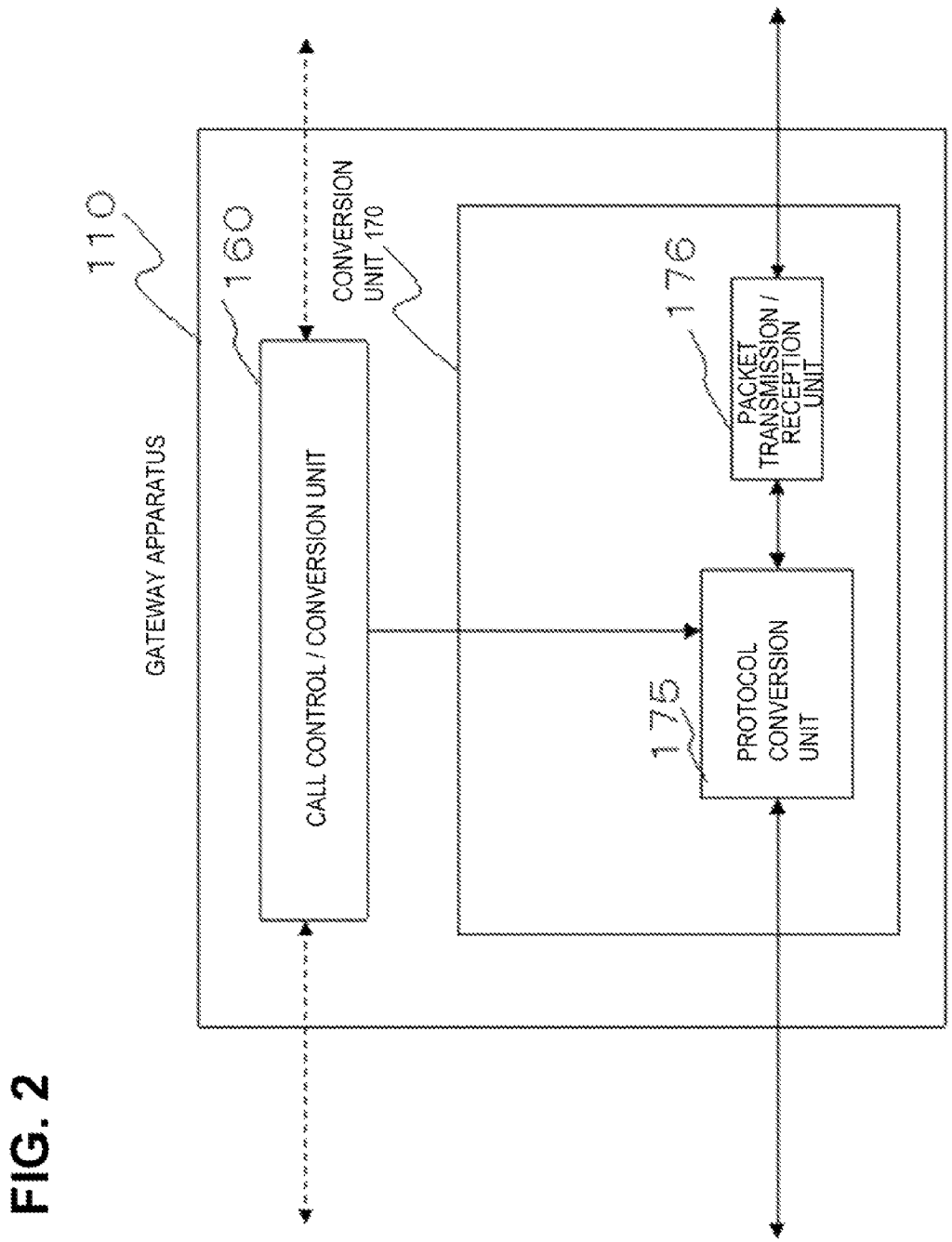
FIG. 2 is a diagram showing a configuration of a gateway apparatus according to the first exemplary embodiment of the present invention.

FIG. 2 illustrates a configuration of the gateway apparatus 110 in FIG. 1. Referring to FIG. 2, the gateway apparatus 110 includes a call control/conversion unit 160 and a conversion unit 170. The conversion unit 170 includes a protocol conversion unit 175 and a packet transmission/reception unit 176.

The call control/conversion unit 160 receives a circuit-switched call control signal (ISUP, for example) from the circuit switching equipment 135 on the mobile circuit-switched network 130 through a circuit-switched bearer (for example, ATM (Asynchronous Transfer Mode) or TDM (Time Division Multiplexing)). The call control/conversion unit 160 next executes a process of causing an LTE and EPC bearer (specifically, an IP bearer) to carry the call control signal. Subsequently, the call control/conversion unit 160 outputs the signal to the packet transfer apparatus 139. When executing such bearer change process, if necessary, an IP-level encryption may be executed by using IPSec (Security Architecture for Internet Protocol) or the like.

Regarding a reverse direction, when the call control/conversion unit 160 receives a circuit-switched call control signal (ISUP, for example) from the packet transfer apparatus 139 on the mobile high-speed network 140 using LTE and EPC through an LET and EPC bearer, the call control/conversion unit 160 executes an IPSec decoding process, if necessary. Subsequently, the call control/conversion unit 160 sets the call control signal on the circuit-switched bearer (ATM or TDM, for example) for output to the circuit switching equipment 135 on the mobile circuit-switched network 130.

The call control/conversion unit 160 outputs necessary information, out of information included in the call control signal from the circuit switching equipment 135 and information included in the call control signal from the packet transfer apparatus 139, on a per channel basis (line), to a control/analysis unit 172 included in the conversion unit 170.

The control/analysis unit 172 receives the information from the call control/conversion unit 160, on a per channel basis, compares the received information, and determines whether protocol conversion for the voice signal is needed.

If it is decided that the conversion is necessary, the control/analysis unit 172 outputs, on a per channel basis, conversion information, which indicates the type of conversion that needs to be executed, to the protocol conversion unit 175.

The protocol conversion unit 175 receives an IuUP circuit-switched protocol frame, which is a circuit-switched protocol, from the circuit switching equipment 135 on the mobile circuit-switched network 130 and configures an RTP (Realtime Transport Protocol) payload format specified in IETF RFC 3267.

Specifically, first, the protocol conversion unit 175 reads an audio compression-encoded bit stream stored in a RAB SubFlow (radio access bearer subflow) of a payload portion in the IuUP protocol frame. In this example, the audio compression-encoded stream is an AMR compression-encoded bit stream.

In addition, the protocol conversion unit 175 receives conversion information from the control/analysis unit 172, on a per channel basis. When instructed that protocol conversion is necessary, the protocol conversion unit 175 configures an RTP payload format header specified in IETF RFC 3267, on a per channel basis, in accordance with the conversion information, for example, and stores the AMR compression-encoded bit stream in an RTP payload portion.

Since frame type information included in the AMR audio compression-encoded bit stream indicates a bit rate, the protocol conversion unit 175 converts the frame type information into CMR (Codec Mode Request) information in RFC 3267.

In addition, the protocol conversion unit 175 executes octet alignment and sets other parameters to predetermined set values, as required for settings according to RFC 3267.

The packet transmission/reception unit 176 receives the above RTP payload format information and AMR audio compression-encoded stream from the protocol conversion unit 175 and stores the information and stream in an RTP packet payload portion and set the RTP/UDP (User Datagram Protocol)/IP packet on the LTE and EPC bearer for output to the packet transfer apparatus 139.

For connection in a reverse direction (from the packet transfer apparatus 139 to the circuit switching equipment 135), the gateway apparatus 110 executes conversion in a reverse path. In this way, the gateway apparatus 110 realizes interconnection between the packet transfer apparatus 139 and the circuit switching equipment 135. Namely, the packet transmission/reception unit 176 receives an RTP/UDP/IP packet in which an AMR compression-encoded stream is stored in an RTP payload format, from the packet transfer apparatus 139, on an LTE and EPC bearer. Next, the packet transmission/reception unit 176 reads an RTP payload format header and extracts an AMR audio compression-encoded stream stored in an RTP payload portion. The protocol conversion unit 175 reads CMR or the like in the RTP payload format header, and based on this information, constructs an IuUP circuit-switched protocol frame. Next, the protocol conversion unit 175 stores the AMR compression-encoded stream in a RAB SubFlow in an IuUP payload portion which is set on a circuit-switched bearer for output to the circuit switching equipment 135 on the mobile circuit-switched network 130.

The mobile terminal 150 is a voice terminal connected to the packet transfer apparatus 139 on LTE and EPC. For example, the mobile terminal 150 includes an AMR audio codec that performs compression encoding of a voice signal, for example, at a bit rate of 12.2 kbps, to generate a bit stream.

In addition, after storing the bit stream in the RTP and generating an RTP packet, the mobile terminal 150 connects to the packet transfer apparatus 139 on the mobile high-speed network 140 and transmits/receives the RTP packet on the UDP/IP. In case of converting an AMR bit stream into an RTP packet, an RTP payload format is needed. For example, regarding RTP payload formats, reference can be made to IETF RFC 3267 specifications. Further, regarding details of voice communication functions of such terminal, reference can be made to 3GPP TS 26.114 specifications, for example.

In the above example, besides the above AMR, any other known codec such as AMR-WB or G.711 can be used as the audio codec used for generation of an audio compression-encoded bit stream.

Any other known protocol such as GTP-U (GPRS Tunneling Protocol User) can be used as the protocol storing an audio compression-encoded stream transmitted and received by the packet transfer apparatus 139.

A security conversion unit may be added in the conversion unit 170 on the mobile high-speed network 140 side. In this way, a security process using IPsec or the like can be executed on packetized IP packets.

In the above embodiment, while arranged in the conversion unit 170, the control/analysis unit 172 may be arranged in the call control/conversion unit 160.

In addition, the call control/conversion unit 160 and the conversion unit 170 may be arranged separately in different apparatuses. If these units 160 and 170 are separately arranged, for example, the ITU-T H.248 MEGACO (Media Gateway Control) protocol can be used for exchange of control signals between the call control/conversion unit 160 and the conversion unit 170.

In addition, besides LTE, for example, HNB (Home NodeB) and HeNB (Home e-NodeB) can be used.

In the above embodiment, of course, a computer program executed on a computer forming the gateway apparatus 110 may realize functions and processing of the call control/conversion unit 160 and the individual units of the conversion unit 170 in the gateway apparatus 110.

Exemplary Embodiment 2

Figure 3:
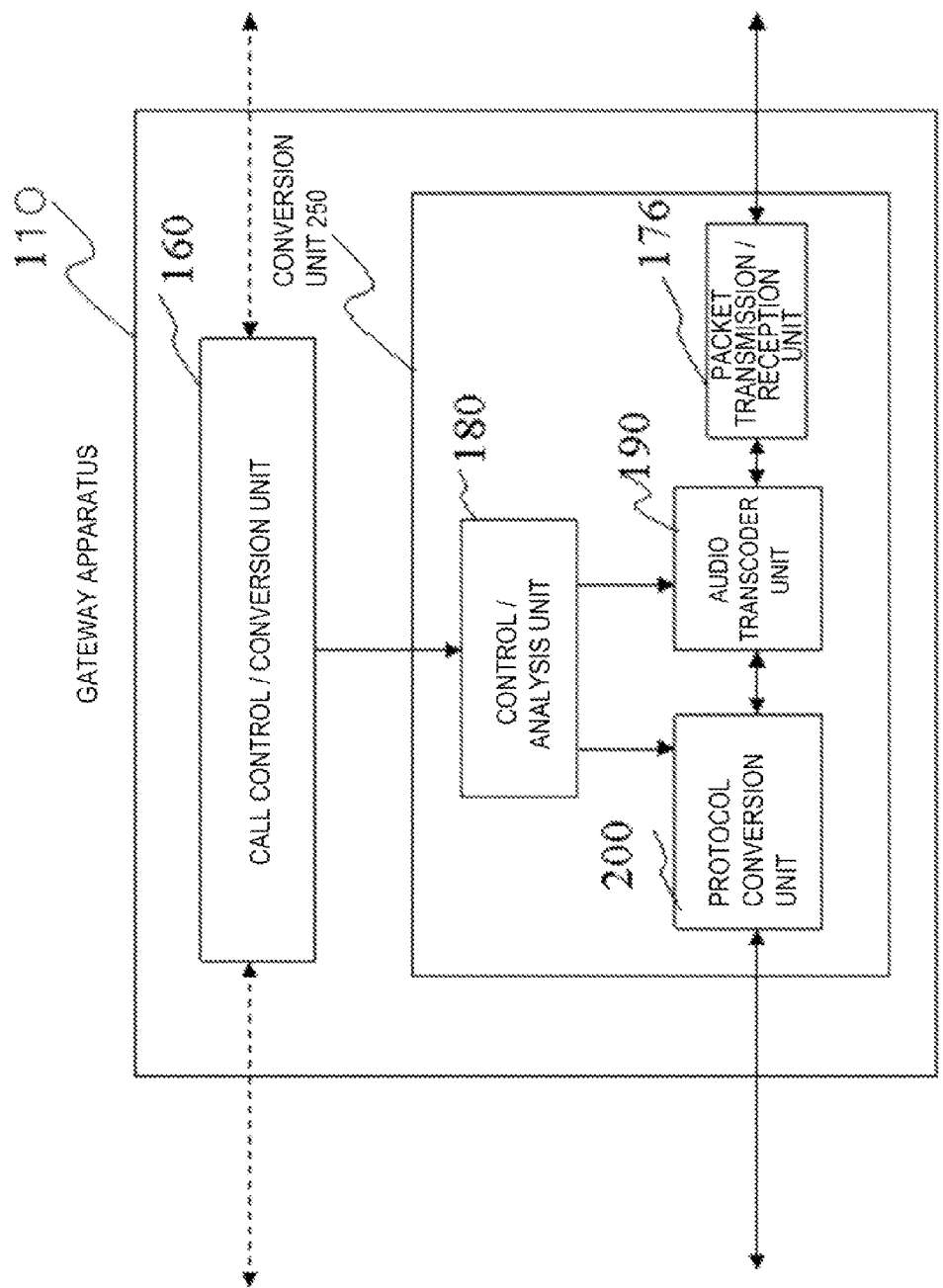
FIG. 3 is a diagram showing a configuration of a gateway apparatus according to a second exemplary embodiment of the present invention.

Next, a second exemplary embodiment of the present invention will be described. FIG. 3 illustrates a configuration according to a second exemplary embodiment of the present invention. In FIG. 3, elements identical to those in FIG. 2 are denoted by identical reference numerals. Thus, description of the elements identical to those according to the example in FIG. 2 will be omitted. The following description will be made with a focus on the difference.

In FIG. 3, since the mobile terminal 120 and the mobile terminal 150 include a different audio compression-encoding scheme, the gateway apparatus 110 converts the audio compression-encoding scheme, in addition to the protocol.

A control/analysis unit 180 analyzes information received from the call control/conversion unit 160. If the audio compression-encoding scheme (audio codec) is different between the terminals, for each channel, the control/analysis unit 180 instructs a protocol conversion unit 200 and an audio transcoder unit 190 to convert the protocol and the audio compression-encoding scheme (audio codec), respectively.

The audio transcoder unit 190 converts the audio compression-encoding scheme (audio codec), based on the conversion instruction from the control/analysis unit 180.

The present example will be described on the assumption that, for example, the mobile terminal 120 on the mobile circuit-switched network 130 side includes an AMR and the mobile terminal 150 on the mobile high-speed network 140 side includes G.711. In this case, the audio transcoder unit 190 converts the audio compression-encoding scheme (audio codec) between AMR and G.711.

The protocol conversion unit 200 converts the protocol, based on the conversion instruction from the control/analysis unit 180. For example, for the circuit switching equipment 135 on the mobile circuit-switched network 130, the protocol conversion unit 200 executes conversion to the IuUP circuit-switched protocol. For example, for the packet transfer apparatus 139 on the mobile high-speed network 140, the protocol conversion unit 200 executes conversion to the RTP protocol. In the case of G.711, no RTP payload format is necessary, unlike in the case of the AMR described in the first embodiment. It is only necessary that a payload type number defined in advance by specifications be written in an RTP header portion, so that G.711 is recognized.

In the present embodiment, besides the above AMR or G.711, any other known codec can be used as the audio codec used for generation of an audio compression-encoded bit stream.

Any other known protocol such as GTP-U can be used as the protocol for storing an audio compression-encoded stream which is transmitted and received by the packet transfer apparatus 139.

In addition, a security conversion unit may be added in the conversion unit 170 on the mobile high-speed network 140 side. This enables to execute a security process using IPsec or the like in which an IP packet is encrypted and transmitted/received.

In the present embodiment, while arranged in the conversion unit 250, the control/analysis unit 180 may be arranged in the call control/conversion unit 160.

In addition, in the present embodiment, the call control/conversion unit 160 and the conversion unit 250 may be arranged separately in different apparatuses. If these units 160 and 250 are separately arranged, for example, the ITU-T H.248 MEGACO protocol can be used for exchange of control signals between the call control/conversion unit 160 and the conversion unit 250.

In addition, the packet transfer apparatus can be connected to HNB (Home NodeB) and HeNB (Home e-NodeB). In the second exemplary embodiment, of course, computer programs executed on a computer forming the gateway apparatus 110 may realize functions and processing of the call control/conversion unit 160 and the individual units of the conversion unit 250 in the gateway apparatus 110.

Meritorious effects of the above described embodiments will be described.

A mobile terminal connected to a circuit switching equipment on a mobile circuit-switched network and a voice terminal connected to a packet transfer apparatus provided on a mobile high-speed network using LTE and EPC can be interconnected to each other, with any combination used, realizing interconnection of voice communication without remodeling the terminals.

Even if the audio compression-encoding scheme is different between mobile terminals, since the gateway apparatus converts the audio compression-encoding scheme, interconnection of voice communication can be achieved without remodeling the terminals.

In addition, a security process is added to a packetization process unit in the gateway apparatus on the mobile high-speed network side. Thus, since security functions are enhanced for packets exchanged between the packet transfer apparatus and the gateway, communication with higher levels of security and reliability can be achieved.

Second Mode

Figure 4:
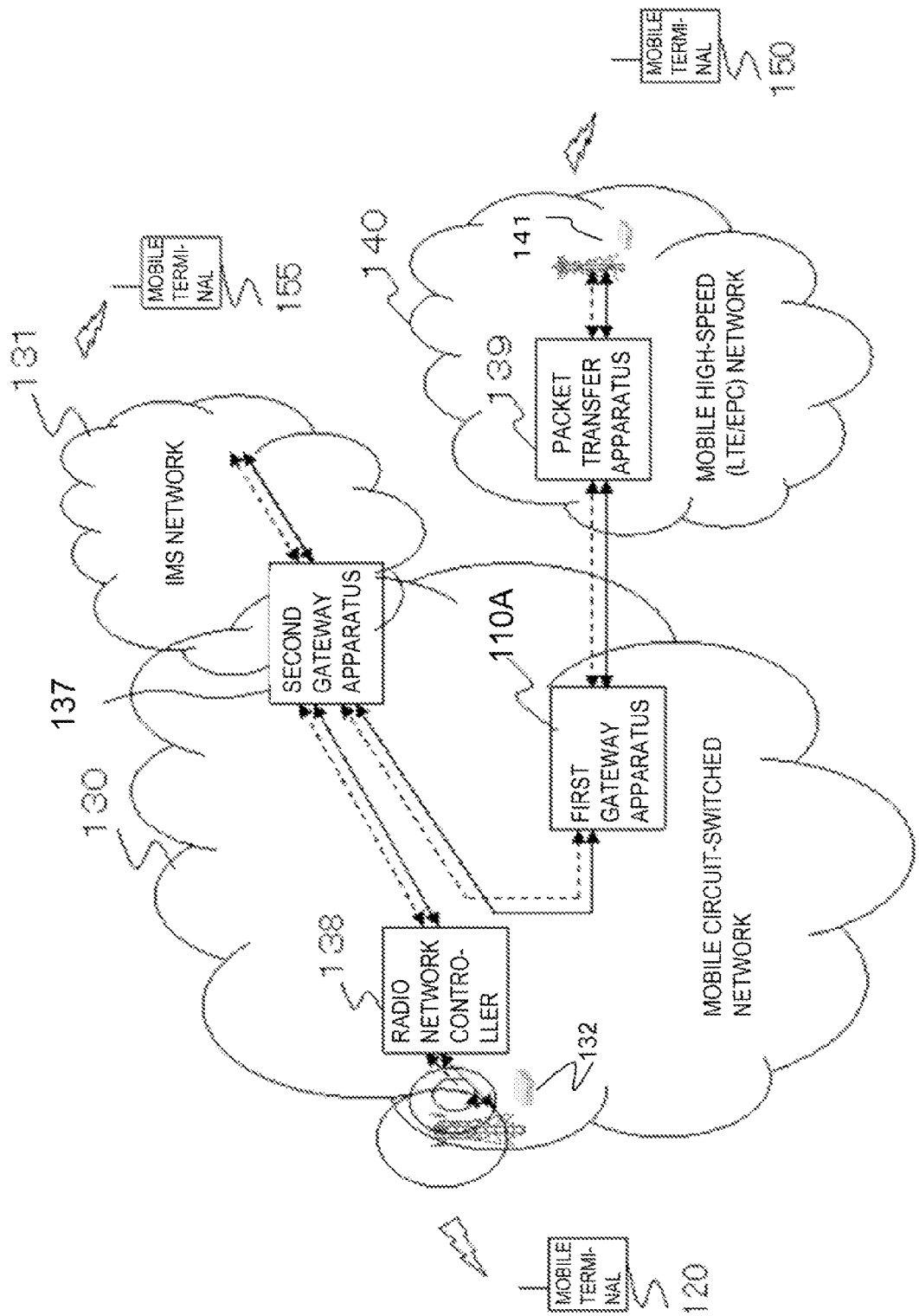
FIG. 4 is a diagram showing a network configuration and a connection mode according to a third exemplary embodiment of the present invention.

According to another one of the preferred modes of the present invention, in FIG. 4, a gateway apparatus (110A) causes a packet transfer apparatus (139) which is connected to LTE and EPC on a mobile high-speed network to operate like an RNC and connects the packet transfer apparatus to a second gateway apparatus (137) that interconnects a mobile circuit-switched network (130) and an IMS network (131) to realize interconnection of voice communication between a mobile terminal (150) which is connected to LTE and EPC and a mobile terminal (120) which is connected to the second gateway apparatus (137) via an RNC (138).

The gateway apparatus (110A) receives at least one of a call control signal using a protocol determined by LTE and EPC and a packet that has voice data stored therein in a predetermined protocol or payload format from the packet transfer apparatus (139) that is connected to LTE and EPC on an LTE and EPC bearer, and converts at least one of the protocol of the call control signal and the protocol or payload format of the packet into a mobile circuit-switched protocol, for output to the second gateway apparatus (137).

The gateway apparatus (110A) receives at least one of a call process signal using a circuit-switched protocol and a voice signal using a circuit switching equipment protocol from the second gateway apparatus (137), and converts at least one of the protocols of the inputted call process signal and voice signal into an LTE and EPC bearer protocol, for output to the packet transfer apparatus (139) that is connected to LTE and EPC.

The call control signal can be transferred between the gateway apparatus (110A) and the packet transfer apparatus (139) that is connected to LTE and EPC in the following two modes:
(A) using a circuit-switched call control signal without change and transferring the signal on an LTE and EPC bearer; and
(B) using SIP (Session Initiation Protocol) used in VoIP and transferring the signal on an LTE and EPC bearer. While the following description will be made based on the former mode (A), the latter mode (B) can be achieved with a similar configuration.

The voice signal can be transferred between the gateway apparatus (110A) and the packet transfer apparatus (139) in the following two modes:
(C) using IuUP (Iu U-Plane), which is a circuit-switched protocol, without change, and transferring the signal on an LTE and EPC bearer; and
(D) using RTP protocol used in VoIP and transferring the signal on an LTE and EPC bearer. While the following description will be made based on the latter mode (D), the former mode (C) can be achieved with a similar configuration. Next, specific examples will be described in view of the above matter.

Exemplary Embodiment 3

FIG. 4 illustrates a network configuration and a connection mode of a gateway apparatus according to a third exemplary embodiment of the present invention. In FIG. 4, a mobile terminal 120 is a voice telephone terminal connected to a mobile circuit-switched network 130. While not particularly limited thereto, an existing voice telephone terminal can be used without change as the mobile terminal 120. The mobile terminal 120 is connected to the mobile circuit-switched network 130 and exchanges a call control signal and a voice signal with a second gateway apparatus 137 via a radio network controller (RNC) 138.

For example, the mobile terminal 120 includes an AMR (Adaptive Multi-Rate) audio codec as an audio codec and transmits/receives a bit stream obtained by compression-encoding a voice signal at a bit rate of 12.2 kbps. Regarding details of the AMR audio codec, reference can be made to 3GPP (Third Generation Partnership Project) TS 26.090 specifications, for example.

The second gateway apparatus 137 exchanges a call process signal such as ISUP (Integrated Services Digital Network User Part) used in the mobile circuit-switched network 130 with the mobile terminal 120, and exchanges an AMR stream as voice data with the mobile terminal 120.

To realize interconnection between the mobile circuit-switched network 130 and an IMS network 131, the second gateway apparatus 137 converts the call process signal into SIP for output to the IMS network 131.

In a reverse direction, that is, upon receiving a SIP signal from the IMS network 131, the second gateway apparatus 137 converts the signal into ISUP or the like for output to the RNC 138 and to a first gateway apparatus 110A.

The gateway apparatus 110A converts a protocol outputted from (inputted to) a packet transfer apparatus 139 into a protocol identical to that outputted from (inputted to) the RNC 138, so that it appears to the second gateway apparatus 137 that the packet transfer apparatus 139 on a mobile high-speed network 140 using LTE, EPC, and the like operates in the same way as the radio network controller (RNC) 138, connects the packet transfer apparatus 139 to the second gateway apparatus 137.

In this way, circuit-switched voice communication from the mobile terminal 120 connected to the mobile circuit-switched network 130 can be interconnected to voice communication from a mobile terminal 150 on LTE and EPC. The mobile terminal 120 is connected to the packet transfer apparatus 139 on the mobile high-speed network 140 via the radio base station 132, the radio network controller (RNC) 138, the second gateway apparatus 137, and the gateway apparatus 110A on the mobile circuit-switched network 130. In this way, the mobile terminal 120 executes interconnection of voice communication with the mobile terminal 150 via a radio base station 141.

In addition, when a far-end side terminal 155 (a terminal connected to the IMS network 131 or a terminal connected to another mobile circuit-switched network or the like (not illustrated) connected to the IMS network 131 via a gateway apparatus (not illustrated)) is connected to the second gateway apparatus 137 via the IMS network 131, this far-end side terminal 155 can execute interconnection of voice communication with the mobile terminal 120 and/or the mobile terminal 150.

For example, at least one of an S-GW (Serving GateWay) and a P-GW (Packet Data GateWay) may be used as the packet transfer apparatus 139 on LTE and EPC.

Namely, the first gateway apparatus 110A communicates with the second gateway apparatus 137 by using: for example,
an ISUP protocol as a call control signal; and
a format in which an AMR audio stream is stored in an IuUP (Iu User Plane) circuit-switched protocol as a voice signal. Regarding the IuUP protocol, reference can be made to 3GPP TS 25.415 specifications, TS 26.102, and the like.

Figure 5:
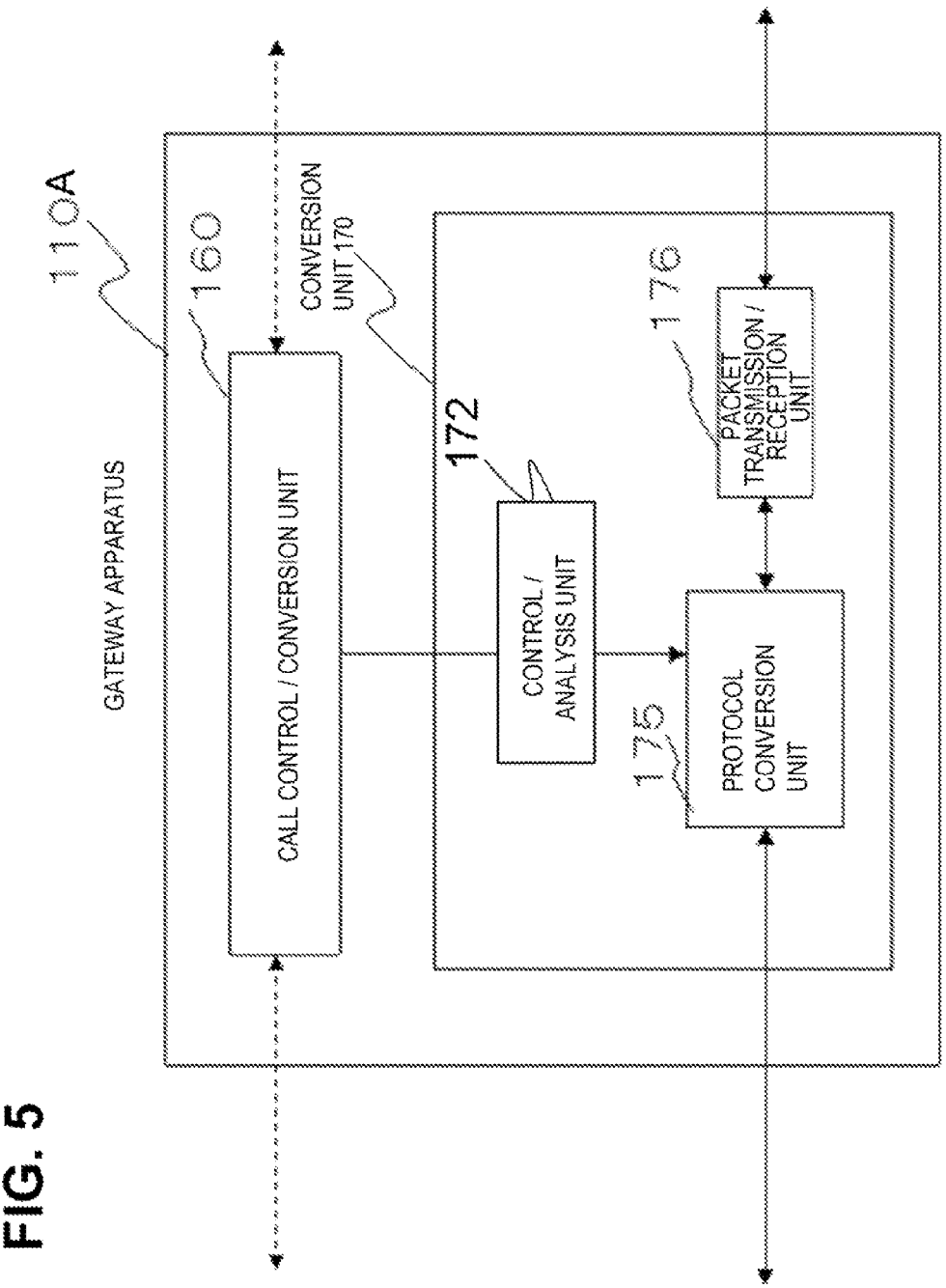
FIG. 5 is a diagram showing a configuration of a gateway apparatus according to the third exemplary embodiment of the present invention.

FIG. 5 illustrates a configuration of the gateway apparatus 110A in FIG. 4. In FIG. 5, the first gateway apparatus 110A includes a call control/conversion unit 160 and a conversion unit 170. The conversion unit 170 includes a control/analysis unit 172, a protocol conversion unit 175, and a packet transmission/reception unit 176.

The call control/conversion unit 160 receives a circuit-switched call control signal (ISUP, for example) from the second gateway apparatus 137 on the mobile circuit-switched network 130 through a circuit-switched bearer (for example, ATM (Asynchronous Transfer Mode) or TDM (Time Division Multiplex)), and sets the call control signal on an LTE and EPC bearer (specifically, an IP bearer), for output to the packet transfer apparatus 139. When executing such bearer change process, if necessary, an IP-level encryption may be executed by using IPSec or the like.

Regarding a reverse direction, when the call control/conversion unit 160 receives a circuit-switched call control signal (ISUP, for example) from the packet transfer apparatus 139 on the mobile high-speed network using LTE and EPC through an LET and EPC bearer, the call control/conversion unit 160 executes an IPSec decoding process, if necessary, and sets the call control signal on the circuit-switched bearer (ATM or TDM, for example) for output the signal to the second gateway apparatus 137.

The call control/conversion unit 160 outputs necessary information, out of information included in the call control signal received from the second gateway apparatus 137 and information included in the call control signal received from the packet transfer apparatus 139, on a per channel (circuit) basis, to the control/analysis unit 172 in the conversion unit 170.

The control/analysis unit 172 receives, on a per channel basis, the information from the call control/conversion unit 160 and compares these items of information, and decides whether protocol conversion for the voice signal is needed.

If it is decided that the protocol conversion is necessary, the control/analysis unit 172 outputs conversion information, which indicates the type of conversion that needs to be executed, on a per channel basis, to the protocol conversion unit 175.

The protocol conversion unit 175 receives an IuUP circuit-switched protocol frame, which is a circuit-switched protocol, from the second gateway apparatus 137 and configures an RTP (Realtime Transport Protocol) payload format defined by IETF RFC 3267.

Specifically, first, the protocol conversion unit 175 reads an audio compression-encoded bit stream stored in a RAB Sub-Flow of a payload portion in the IuUP protocol frame. In this embodiment, the audio compression-encoded stream is an AMR compression-encoded bit stream.

In addition, the protocol conversion unit 175 receives the conversion information from the control/analysis unit 172, on a per channel basis. If instructed to execute protocol conversion, in accordance with the conversion information, for example, the protocol conversion unit 175 configures an RTP payload format header defined by IETF RFC 3267, on a per channel basis and stores the AMR compression-encoded bit stream in an RTP payload portion.

Since frame type information included in the AMR audio compression-encoded bit stream indicates a bit rate, the protocol conversion unit 175 converts the frame type information into CMR (Codec Mode Request) information defined in RFC 3267.

In addition, the protocol conversion unit 175 executes octet alignment and sets other parameters to predetermined set values, as required for settings defined in RFC 3267.

The packet transmission/reception unit 176 receives the above RTP payload format information and AMR audio compression-encoded stream from the protocol conversion unit 175 and stores the information and stream in an RTP packet payload portion, sets the RTP/UDP (User Datagram Protocol)/IP packet on the LTE and EPC bearer, for output to the packet transfer apparatus 139.

For connection in a reverse direction (from the packet transfer apparatus 139 to the second gateway apparatus 137), the first gateway apparatus 110A executes conversion in a reverse path. In this way, the gateway apparatus 110A realizes interconnection between the packet transfer apparatus 139 and the second gateway apparatus 137.

Namely, the packet transmission/reception unit 176 receives an RTP/UDP/IP packet in which an AMR compression-encoded stream is stored in an RTP payload format from the packet transfer apparatus 139 on an LTE and EPC bearer, reads an RTP payload format header and extracts an AMR audio compression-encoded stream stored in an RTP payload portion. The protocol conversion unit 175 reads CMR or the like in the RTP payload format header, based on this information, configures an IuUP circuit-switched protocol frame, and stores the AMR compression-encoded stream in a RAB SubFlow in an IuUP payload portion, and sets the packet on a circuit-switched bearer, for output to the second gateway apparatus 137 on the mobile circuit-switched network 130.

The mobile terminal 150 is a voice terminal connected to the packet transfer apparatus 139 on LTE and EPC. For example, the mobile terminal 150 includes an AMR audio codec that performs compression encoding of a voice signal, for example, at a bit rate of 12.2 kbps, to generate a bit stream.

In addition, after storing the bit stream in the RTP and generating an RTP packet, the mobile terminal 150 connects to the packet transfer apparatus 139 on the mobile high-speed network 140 and transmits/receives the RTP packet on the UDP/IP.

To convert an AMR bit stream into an RTP packet, an RTP payload format is needed. Regarding RTP payload format, reference can be made to IETF RFC 3267 specifications, for example. Further, regarding details of voice communication functions of such terminal, reference can be made to 3GPP TS 26.114 specifications, for example.

In the above embodiment, besides the above AMR, any other known codec such as AMR-WB or G.711 can be used as the audio codec used for generation of an audio compression-encoded bit stream.

Any other known protocol such as GTP-U (GPRS Tunneling Protocol User) can be used as the protocol storing an audio compression-encoded stream transmitted and received by the packet transfer apparatus 139.

A security conversion unit may be added in the conversion unit 170 on the mobile high-speed network 140 side. A security process using IPsec or the like can be executed on a packetized IP packet.

In addition, while arranged in the conversion unit 170, the control/analysis unit 172 may be arranged in the call control/conversion unit 160.

In addition, the call control/conversion unit 160 and the conversion unit 170 may be arranged separately in different apparatuses. If these units 160 and 170 are separately arranged, for example, the ITU-T H.248 MEGACO (Media Gateway Control) protocol can be used for exchange of control signals between the call control/conversion unit 160 and the conversion unit 170.

In addition, besides LTE, for example, HNB (Home NodeB) and HeNB (Home e-NodeB) can be used.

In the above embodiment, of course, computer programs executed on a computer forming the first gateway apparatus 110A may realize functions and processing of the call control/conversion unit 160 and the individual units of the conversion unit 170 in the first gateway apparatus 110A.

Exemplary Embodiment 4

Figure 6:
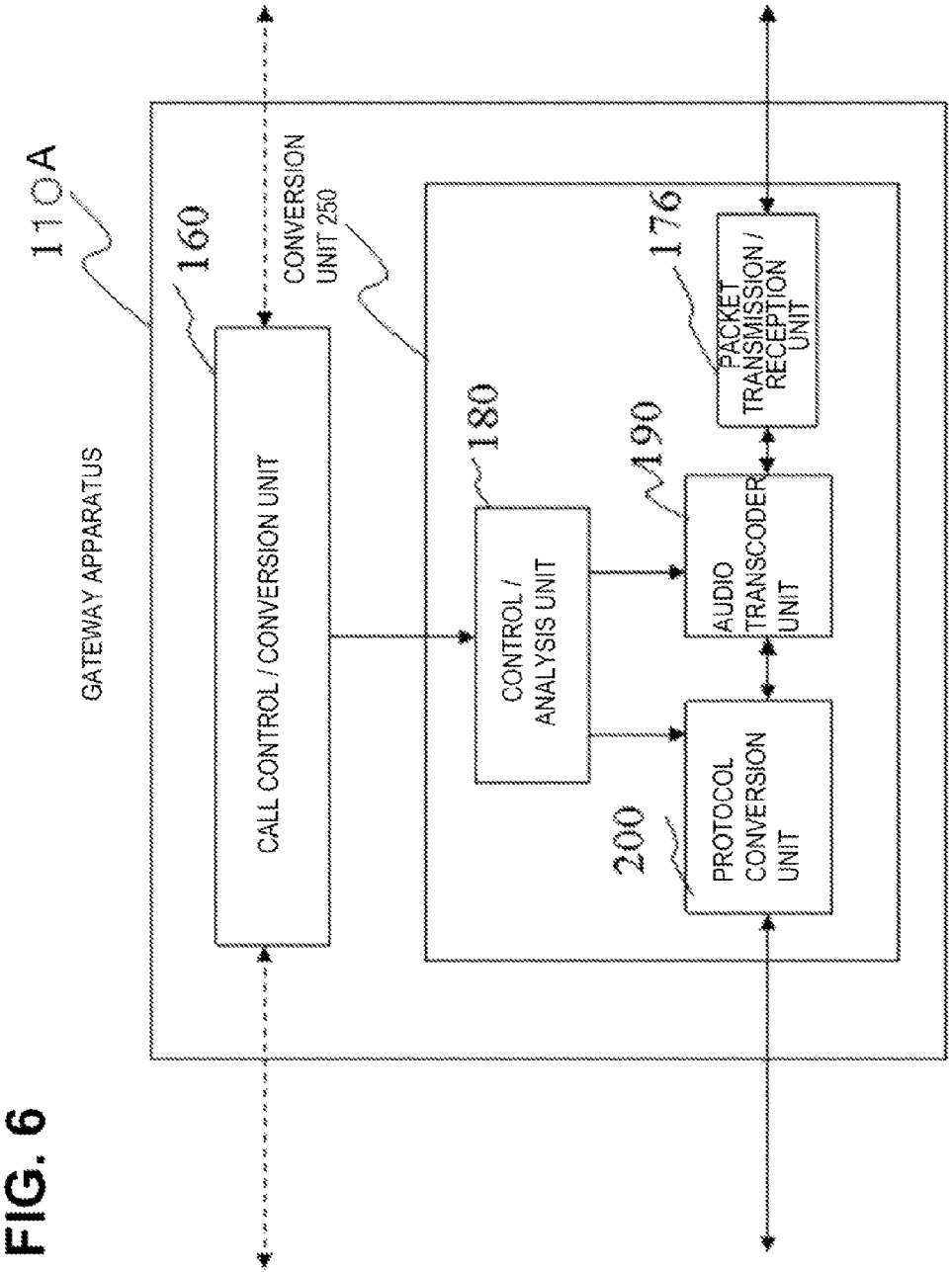
FIG. 6 is a diagram showing a configuration of a gateway apparatus according to a fourth exemplary embodiment of the present invention.

Next, a fourth exemplary embodiment of the present invention will be described. FIG. 6 illustrates a configuration according to the fourth exemplary embodiment of the present invention. In FIG. 6, elements identical to those in FIG. 5 are denoted by identical reference numerals. Thus, description of the elements identical to those according to the example in FIG. 5 will be omitted. The following description will be made with a focus on the difference.

In FIG. 6, since the mobile terminal 120 and the mobile terminal 150 include a different audio compression-encoding scheme, the first gateway apparatus 110A converts the audio compression-encoding scheme, in addition to the protocol.

A control/analysis unit 180 analyzes information received from the call control/conversion unit 160. If the audio compression-encoding scheme (audio codec) is different between the terminals, the control/analysis unit 180 instructs a protocol conversion unit 200 and an audio transcoder unit 190 to convert the protocol and the audio compression-encoding scheme (audio codec), for each channel.

The audio transcoder unit 190 converts the audio compression-encoding scheme (audio codec), based on the conversion instruction from the control/analysis unit 180.

In the present embodiment, it is assumed that the mobile terminal 120 on the mobile circuit-switched network 130 side includes an AMR codec and the mobile terminal 150 on the mobile high-speed network 140 side includes a G.711 codec, for example. In this case, the audio transcoder unit 190 converts the audio compression-encoding scheme (audio codec) between AMR and G.711.

The protocol conversion unit 200 converts the protocol, based on the conversion instruction from the control/analysis unit 180. For example, for the second gateway apparatus 137 on the mobile circuit-switched network 130, the protocol conversion unit 200 executes conversion to the IuUP circuit-switched protocol. For the packet transfer apparatus 139 on the mobile high-speed network 140, the protocol conversion unit 200 executes conversion to the RTP protocol. In the case of G.711, no RTP payload format is necessary, unlike in the case of the AMR described in the first exemplary embodiment. It is only necessary that a payload type number determined in advance by specifications be written in an RTP header portion, so that G.711 is recognized.

In the present embodiment, besides the above AMR or G.711, any other known codec can be used as the audio codec used for generation of an audio compression-encoded bit stream.

In addition, any other known protocol such as GTP-U can be used as the protocol for storing an audio compression-encoded stream transmitted and received by the packet transfer apparatus 139.

A security conversion unit (not shown) may be added in an output unit of the conversion unit 170 on the mobile high-speed network 140 side.

This enable to execute security processing using IPsec (Security Architecture for Internet Protocol) or the like, in which a packetized IP packet is encrypted and transmitted/received.

In the present embodiment, while arranged in the conversion unit 250, the control/analysis unit 180 may be arranged in the call control/conversion unit 160.

In addition, in the present embodiment, the call control/conversion unit 160 and the conversion unit 250 may be arranged separately in different apparatuses. If these units 160 and 250 are separately arranged, for example, the ITU-T H.248 MEGACO protocol can be used for exchange of control signals between the call control/conversion unit 160 and the conversion unit 250.

In addition, the packet transfer apparatus 139 can be connected to HNB (Home NodeB) and HeNB (Home e-NodeB). In this embodiment, of course, computer programs executed on a computer forming the first gateway apparatus 110A may realize functions and processes of the call control/conversion unit 160 and the individual units of the conversion unit 250 in the first gateway apparatus 110A.

Figure 7:
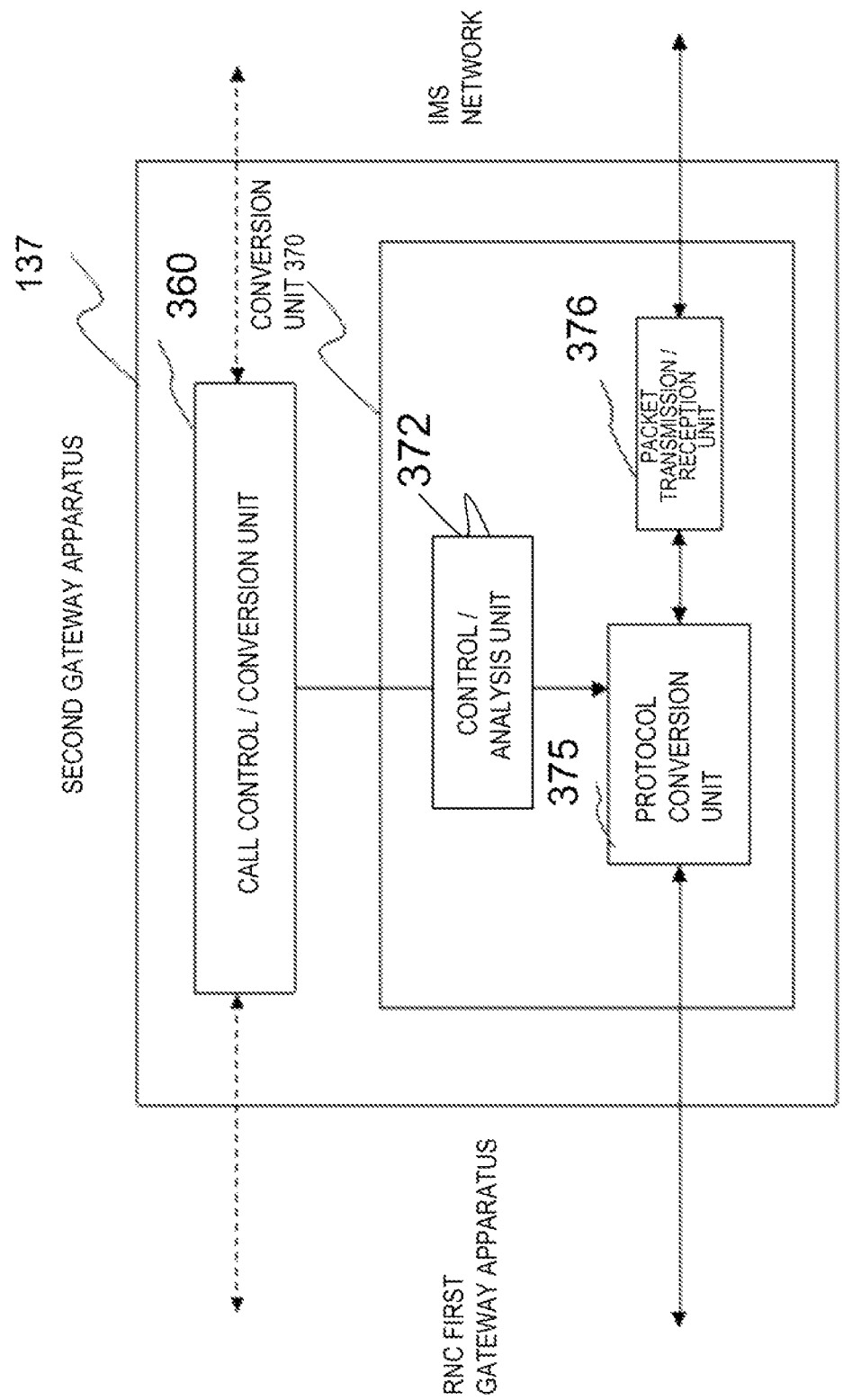
FIG. 7 is a diagram showing a configuration example of a second gateway apparatus in FIG. 4.

Next, the second gateway apparatus 137 will be described with reference to FIG. 7. FIG. 7 illustrates a configuration example of the second gateway apparatus 137. In the present invention, the second gateway apparatus 137 is not limited only to the following configuration. An arbitrary configuration can of course be used, as long as the second gateway apparatus 137 can realize interconnection of voice communication between the mobile circuit-switched network 130 and the IMS network 131.

The second gateway apparatus 137 is arranged between the mobile circuit-switched network 130 and the IMS network 131, interconnects voice communication, and includes a call control/conversion unit 360 and a conversion unit 370. The call control/conversion unit 360 receives a call control signal (for example, a SIP (Session Initiation Protocol) signal or an SDP (Session Description Protocol) signal) from the IMS network 131, and converts the signal into a circuit-switched call control signal, for output to the RNC 138 and the first gateway apparatus 110A on the mobile circuit-switched network 130. In addition, the call control/conversion unit 360 receives a circuit-switched call control signal from the RNC 138 or the first gateway apparatus 110A on the mobile circuit-switched network 130, converts the signal into a SIP signal, an SDP signal, or the like, for output to the IMS network 131.

Regarding SIP and SDP, reference can be made to RFC 3261 and RFC 2327 of the IETF (Internet Engineering Task Force), respectively.

The call control/conversion unit 360 may receive location information about the far-end side terminal 155 connected to the IMS network 131 (for example, a mobile terminal connected to a mobile circuit-switched network and the like beyond the IMS network 131 via a gateway apparatus (not illustrated)), so as to determine whether the IP address of a packet of a corresponding channel transmitted from the second gateway apparatus 137 to the IMS network 131 side is changed by movement of the far-end side terminal. If the IP address of the packet of the corresponding channel is changed, the call control/conversion unit 360 outputs destination IP address change instructions to a packet transmission/reception unit 376.

The call control/conversion unit 360 outputs preset information, out of information included in the call control signal received from the RNC 138 or the first gateway apparatus 110A on the mobile circuit-switched network 130 and information included in the call control signal (SIP or SDP) received from the IMS network 131, to a control/analysis unit 372 in the conversion unit 370, on a per channel basis.

The control/analysis unit 372 compares the information received from the call control/conversion unit 360, for each channel, to decide whether protocol conversion is necessary. If protocol conversion is necessary, the control/analysis unit 372 outputs conversion information, which indicates the type of conversion that needs to be executed, to a protocol conversion unit 375, on a per channel basis. The protocol conversion unit 375 receives an IuUP circuit-switched protocol from the mobile circuit-switched network 130 and reads an audio compression-encoded bit stream stored in the protocol. In this example, the audio compression-encoded bit stream is an AMR compression-encoded bit stream.

The protocol conversion unit 375 further receives the conversion information from the control/analysis unit 372, on a per channel basis. If protocol conversion is necessary, the protocol conversion unit 375 configures an RTP (Real-time Transport Protocol) payload format header defined by IETF RFC 3267, on a per channel basis, by using the AMR compression-encoded bit stream, in accordance with the conversion information. Next, the protocol conversion unit 375 stores the AMR compression-encoded bit stream in a payload portion. Since frame type information included in the AMR audio compression-encoded bit stream indicates a bit rate, the protocol conversion unit 375 converts the frame type information into Codec Mode Request (CMR) information specified in RFC 3267. In addition, the protocol conversion unit 375 executes octet alignment and sets other necessary parameters to predetermined set values, as defined in RFC 3267.

The packet transmission/reception unit 376 receives the RTP payload format information from the protocol conversion unit 375 and stores the information in an RTP packet. If a terminal moves and the IP address thereof changes, the packet transmission/reception unit 376 receives a changed IP address from the control/analysis unit 372. If no IP address changes, the packet transmission/reception unit 376 uses the IP address as is and transmits RTP/UDP (User Datagram Protocol)/IP (Internet Protocol) to the said IP address.

In addition, the call control/conversion unit 360 receives location information on the far-end side terminal 155 which is connected to a mobile circuit-switched network (not illustrated) that is interconnected to the IMS network 131 via a gateway apparatus (not illustrated), and determines whether a transmission source IP address of a packet of a corresponding channel received from the IMS network 131 side is changed by movement of the far-end side terminal 155. If the transmission source IP address is changed, the call control/conversion unit 360 outputs a transmission source IP address change instruction to the packet transmission/reception unit 376. The packet transmission/reception unit 376 receives a packet from the IMS network 131. When the far-end side terminal 155 moves and the transmission source IP address changes, the packet transmission/reception unit 376 receives a changed IP address, changes a route to a reception destination, and receives an RTP/UDP/IP packet.

The RTP packet received by the packet transmission/reception unit 376 is inputted to the protocol conversion unit 375, and the packet is next outputted from the protocol conversion unit 375 to the RNC 138 and the first gateway apparatus 110A on the mobile circuit-switched network 130. In FIG. 7, the second gateway apparatus 137 may include an audio codec between the protocol conversion unit 375 and the packet transmission/reception unit 376. In addition, in FIG. 7, illustration of an SN/TS change unit that holds the last SN (sequence number) or TS (time stamp) is omitted. When a terminal moves and an IP address thereof changes, the SN/TS change unit receives a movement completion notification from the control/analysis unit 372 and if necessary, changes (replaces) the SN or TS, so that an SN or TS of an RTP packet transmitted to a different IP address continuously changes after such movement completion notification, in order for the an SN or TS of an RTP packet not to have a value older than or identical to the SN or TS that is held. In addition, illustration of a jitter buffer unit is omitted. The jitter buffer unit receives an RTP packet from the packet transmission/reception unit 376 and removes the jitter (delay fluctuation) of the RTP packet.

According to the present invention, it is possible to achieve voice communication between a mobile terminal connected to a gateway apparatus (second gateway apparatus) interconnecting a mobile circuit-switched network and an IMS network and a terminal connected to a packet transfer apparatus provided on a mobile high-speed network using LTE and EPC. It is also possible to achieve voice communication between at least one of these terminals and a terminal connected to a network beyond the IMS network. Regardless of the connection combination used, interconnection of voice communication can be achieved without making changes to the terminals.

In addition, according to the present invention, even if the audio compression-encoding scheme is different between terminals, since the gateway apparatus converts the audio compression-encoding scheme, interconnection of voice communication can be achieved without making changes to the terminals.

In addition, according to the present invention, a security process is added to a packetization process unit in the gateway apparatus on the mobile high-speed network side. This enhances security function for a packet exchanged between the packet, transfer apparatus and the gateway, to achieve communication with higher levels of security and reliability.

The entire disclosures of the above Patent Documents are incorporated herein by reference thereto. Modifications and adjustments of the embodiments and examples are possible within the scope of the overall disclosure (including claims) of the present invention and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

The whole or part of the exemplary embodiments disclosed above can be described as, but not limited to, the following Supplementary notes.

Supplementary Note 1

A gateway apparatus that connects a packet transfer apparatus provided on a mobile high-speed network to a circuit switching equipment on a mobile circuit-switched network to achieve voice communication;
wherein the gateway apparatus receives at least one of a call control signal, and a packet that has voice data stored therein in a predetermined protocol or payload format from the packet transfer apparatus on the mobile high-speed network, and if it is decided that at least one of: the call control signal, the protocol, and the payload format needs to be converted, executes conversion into a protocol identical to a circuit-switched protocol used when a radio network controller (RNC) on the mobile circuit-switched network connects to the circuit switching equipment for output to the circuit switching equipment; and
wherein the gateway apparatus receives at least one of: a call process signal using a protocol identical to a protocol used when the circuit switching equipment outputs data to the radio network controller; and a voice signal stored by using the identical protocol, if it is decided that at least one of the protocol of the received call control signal and the protocol of the received voice signal needs to be converted, and converts at least one of the protocol of the call control signal and the protocol of the voice signal for output to the packet transfer apparatus on the mobile high-speed network.

Supplementary Note 2

The gateway apparatus according to Supplementary note 1, comprising a conversion unit that converts an audio compression-encoding scheme for a voice signal.

Supplementary Note 3

The gateway apparatus according to Supplementary note 1 or 2, comprising a means that enhance a security function for exchange of a packet with the mobile high-speed network.

Supplementary Note 4

The gateway apparatus according to any one of notes 1 to 3; wherein the mobile high-speed network comprises at least one of LTE, EPC, Home NodeB, and Home eNodeB.

Supplementary Note 5

The gateway apparatus according to any one of notes 1 to 4, comprising:
a call control/conversion unit; and
a conversion unit, wherein the conversion unit comprises:
a control/analysis unit; a protocol conversion unit; and a packetization unit, wherein
the control/conversion unit receives a call control signal from the circuit switching equipment on the mobile circuit-switched network, and in case it is decided that the call control signal needs to be converted, converts the call control signal into a call control signal corresponding to the packet transfer apparatus on the mobile high-speed network, for output to the packet transfer apparatus, the call control/conversion unit receives a call control signal from the packet transfer apparatus on the mobile high-speed network and if it is decided that the call control signal needs to be converted, converts a protocol of the call control signal into a protocol identical to a protocol used when the radio network controller on the mobile circuit-switched network is connected to the circuit switching equipment for output to the circuit switching equipment, the call control/conversion unit outputs preset information, out of information included in a call control signal received from the packet transfer apparatus on the mobile high-speed network and information included in a call control signal received from the packet transfer apparatus, in association with a channel to the control/analysis unit, the control/analysis unit receives the information from the call control/conversion unit, on a per channel basis and decides whether protocol conversion is necessary, and if protocol conversion is necessary, the control/analysis unit outputs conversion information defining conversion contents to the protocol conversion unit, on a per channel basis;

the protocol conversion unit executes conversion between a circuit-switched protocol frame from the circuit switching equipment on the mobile circuit-switched network and a protocol or payload format of the packet from the packet transfer apparatus on the mobile high-speed network, in accordance with the conversion information, and the packetization unit receives payload format information from the protocol conversion unit and packetizes the information to output the packetized information.

Supplementary Note 6

A gateway method by a gateway apparatus that connects a packet transfer apparatus provided on a mobile high-speed network to a circuit switching equipment on a mobile circuit-switched network to achieve voice communication, the method comprising:

receiving at least one of a call control signal, and a packet that has voice data stored therein in a predetermined protocol or payload format from the packet transfer apparatus on the mobile high-speed network;

converting at least one of the call control signal, the protocol, and the payload format, if it is decided that conversion thereof is necessary, into a protocol identical to a circuit-switched protocol used when a radio network controller (RNC) on the mobile circuit-switched network connects to the circuit switching equipment for output to the circuit switching equipment;

receiving at least one of: a call process signal using a protocol identical to a protocol used when the circuit switching equipment outputs data to the radio network controller, and a voice signal stored by using the identical protocol; and converting at least one of the protocol of the received call control signal and the protocol of the received audio signal, if it is decided that at least one of the protocol of the call control signal and the protocol of the audio signal is necessary, for output to the packet transfer apparatus on the mobile high-speed network.

Supplementary Note 7

The gateway method according to Supplementary note 6, comprising
converting an audio compression-encoding scheme for a voice signal.

Supplementary Note 8

The gateway method according to Supplementary note 6 or 7, comprising enhancing a security function for exchange of a packet with the mobile high-speed network.

Supplementary Note 9

A program causing a computer forming a gateway apparatus, which connects a packet transfer apparatus provided on a mobile high-speed network to a circuit switching equipment on a mobile circuit-switched network to achieve voice communication, to execute the processing comprising:

receiving at least one of: a call control signal and a packet that has voice data stored therein in a predetermined protocol or payload format from the packet transfer apparatus on the mobile high-speed network;

converting at least one of the call control signal the protocol and the payload format, if it is decided that conversion thereof is necessary, into a protocol identical to a circuit-switched protocol used when a radio network controller (RNC) on the mobile circuit-switched network connects to the circuit switching equipment, for output to the circuit switching equipment;

receiving at least one of: a call process signal using a protocol identical to a protocol used when the circuit switching equipment outputs data to the radio network controller and a voice signal stored by using the identical protocol; and converting at least one of the protocol of the received call control signal and the protocol of the received audio signal, if it is decided that at least one of the protocol of the call control signal and the protocol of the audio signal needs to be converted, for output to the packet transfer apparatus on the mobile high-speed network.

Supplementary Note 10

The program according to Supplementary note 9, causing the computer to execute a processing that converts an audio compression-encoding scheme for a voice signal.

Supplementary Note 11

The program according to Supplementary note 9 or 10, causing the computer to execute a processing of enhancing a security function for exchange of a packet with a mobile high-speed network.

Supplementary Note 12

A gateway apparatus that connects a packet transfer apparatus provided on a mobile high-speed network to a circuit switching equipment on a mobile circuit-switched network to achieve voice communication, wherein the gateway apparatus converts a protocol of the packet transfer apparatus into a protocol identical to a protocol of a radio network controller (RNC), so that it appears to the circuit switching equipment on the mobile circuit-switched network that the packet transfer apparatus on the mobile high-speed network operates in the same way as the radio network controller (RNC) on the mobile circuit-switched network, and connects the packet transfer apparatus to the circuit switching equipment, so as to achieve voice communication between a terminal connected to a circuit switching equipment and a terminal connected to the mobile high-speed network via the radio network controller (RNC).

Supplementary Note 13

A gateway method by a gateway apparatus that connects a packet transfer apparatus provided on a mobile high-speed network to a circuit switching equipment on a mobile circuit-switched network to achieve voice communication, the method comprising:

converting a protocol of the packet transfer apparatus into a protocol identical to a protocol of a radio network controller (RNC), so that the packet transfer apparatus appears to the circuit switching equipment on the mobile circuit-switched network that the packet transfer apparatus on the mobile high-speed network operates in the same way as the radio network controller (RNC) on the mobile circuit-switched network;

connecting the packet transfer apparatus to the circuit switching equipment; and achieving voice communication between a terminal connected to a circuit switching equipment and a terminal connected to the mobile high-speed network via the radio network controller (RNC).

Supplementary Note 14

A gateway apparatus that connects a packet transfer apparatus provided on a mobile high-speed network to a second gateway apparatus that interconnects a mobile circuit-switched network and an IMS network, wherein the gateway apparatus receives at least one of a call control signal, and a packet that has voice data stored therein in a predetermined protocol or payload format from the packet transfer apparatus, the gateway apparatus converts at least one of: the call control signal, the protocol, and the payload format, if the gateway apparatus decides that conversion thereof is necessary, into a protocol identical to a circuit-switched protocol used when a radio network controller (RNC) connects to the second gateway apparatus for output to the second gateway apparatus, and wherein the gateway apparatus receives at least one of: a call process signal using a protocol identical to a protocol used when the second gateway apparatus outputs data to the radio network controller, and a voice signal stored by using the identical protocol from the second gateway apparatus, and if the gateway apparatus decides that conversion of at least one of the protocol of the received call control signal and the protocol of the received audio signal is necessary, the gateway apparatus converts the at least one for output to the packet transfer apparatus.

Supplementary Note 15

The gateway apparatus according to Supplementary note 14, comprising a conversion unit that converts an audio compression-encoding scheme for a voice signal.

Supplementary Note 16

The gateway apparatus according to Supplementary note 14 or 15, comprising a means that enhances a security function for exchange of a packet with the mobile high-speed network.

Supplementary Note 17

The gateway apparatus according to any one of notes 14 to 16; wherein the mobile high-speed network comprises at least one of LTE, EPC, Home NodeB, and Home eNodeB.

Supplementary Note 18

The gateway apparatus according to any one of notes 14 to 17, comprising:

a call control/conversion unit; and a conversion unit, wherein the conversion unit comprises: a control/analysis unit; a protocol conversion unit; and a packet transmission/reception unit;

wherein the call control/conversion unit receives a call control signal from the second gateway apparatus that interconnects a mobile circuit-switched network and an IMS network, if it is decided that the call control signal needs to be converted, the call control/conversion unit converts the call control signal into a call control signal corresponding to the packet transfer apparatus for output to the packet transfer apparatus, the call control/conversion unit receives a call control signal from the packet transfer apparatus, if it is decided that the call control signal needs to be converted, the call control/conversion unit executes conversion into a protocol identical to a protocol used when the radio network controller connects to the second gateway apparatus for output to the second gateway apparatus, the call control/conversion unit outputs preset information, out of information included in a call control signal received from the packet transfer apparatus and information included in a call control signal received from the packet transfer apparatus, in association with a channel, to the control/analysis unit, the control/analysis unit receives the information from the call control/conversion unit, on a per channel basis, determines whether protocol conversion is necessary, and if protocol conversion is necessary, the control/analysis unit outputs conversion information defining conversion contents to the protocol conversion unit, on a per channel basis, the protocol conversion unit executes conversion between a circuit-switched protocol frame from the second gateway apparatus and a protocol or payload format of the packet from the packet transfer apparatus, in accordance with the conversion information, and the packet transmission/reception unit receives payload format information from the protocol conversion unit, and packetizes the information to output the packetized information.

Supplementary Note 19

The gateway apparatus according to Supplementary note 18;

wherein the packet transmission/reception unit receives a packet from the packet transfer apparatus and extracts compression-encoded data stored in a payload portion, and the protocol conversion unit converts compression-encoded data from the packet transmission/reception unit into a circuit-switch protocol frame for output to the second gateway apparatus on the mobile circuit-switched network.

Supplementary Note 20

A gateway method by a gateway apparatus that connects a packet transfer apparatus provided on a mobile high-speed network to a second gateway apparatus that interconnects a mobile circuit-switched network and an IMS network to achieve voice communication, the method comprising:

receiving at least one of: a call control signal using a predetermined protocol and a packet that has voice data stored therein in a predetermined protocol or payload format from the packet transfer apparatus;

converting at least one of the protocol of the call control signal, the protocol of the packet, and the payload format of the packet, if it is decided that conversion thereof is necessary, into a protocol identical to a circuit-switched protocol used when a radio network controller (RNC) connects to the second gateway apparatus for output to the second gateway apparatus;

receiving at least one of: a call process signal using a protocol identical to a protocol used when the second gateway apparatus outputs data to the radio network controller, and a voice signal using the identical protocol from the second gateway apparatus; and converting at least one of the protocols, if it is decided that conversion thereof is necessary, for output to the packet transfer apparatus.

Supplementary Note 21

The gateway method according to Supplementary note 20, comprising converting an audio compression-encoding scheme for a voice signal.

Supplementary Note 22

The gateway method according to Supplementary note 20 or 21, comprising
enhancing a security function for exchange of a packet with a mobile high-speed network.

Supplementary Note 23

A program, causing a computer forming a gateway apparatus, which connects a packet transfer apparatus provided on a mobile high-speed network to a second gateway apparatus that interconnects a mobile circuit-switched network and an IMS network to achieve voice communication, to execute the processing comprising:

receiving at least one of: a call control signal using a predetermined protocol and a packet that has voice data stored therein in a predetermined protocol or payload format from the packet transfer apparatus on the mobile high-speed network;

converting at least one of the protocol of the call control signal, the protocol of the packet, and the payload format of the packet, if it is decided that conversion thereof is necessary, into a predetermined circuit-switched protocol for output to the second gateway apparatus;

receiving at least one of a call process signal using a predetermined circuit-switched protocol, and a voice signal using a predetermined circuit-switched protocol; and converting at least one of the protocols, if it is decided that conversion thereof is necessary, for output to the packet transfer apparatus on the mobile high-speed network.

Supplementary Note 24

The program according to Supplementary note 23, causing the computer to execute a processing of converting an audio compression-encoding scheme for a voice signal.

Supplementary Note 25

The program according to Supplementary note 23 or 24, causing the computer to execute a processing of enhancing a security function for exchange of a packet with a mobile high-speed network.

Supplementary Note 26

A gateway apparatus that connects a packet transfer apparatus provided on a mobile high-speed network to a second gateway apparatus that interconnects a mobile circuit-switched network and an IMS network, wherein the gateway apparatus converts a protocol of the packet transfer apparatus into a protocol identical to a protocol of a radio network controller (RNC), so that it appears to the second gateway apparatus on the mobile circuit-switched network that the packet transfer apparatus on the mobile high-speed network operates in the same way as the radio network controller (RNC) on the mobile circuit-switched network, and connects the packet transfer apparatus to the second gateway apparatus, so as to achieve voice communication between a terminal connected to the second gateway apparatus and a terminal connected to the mobile high-speed network via the radio network controller (RNC).

Supplementary Note 27

A gateway method by a gateway apparatus that connects a packet transfer apparatus provided on a mobile high-speed network to a second gateway apparatus that interconnects a mobile circuit-switched network and an IMS network; the gateway method comprising:

causing the gateway apparatus to convert a protocol of the packet transfer apparatus into a protocol identical to a protocol of a radio network controller (RNC), so that it appears to the second gateway apparatus on the mobile circuit-switched network that the packet transfer apparatus on the mobile high-speed network operates in the same way as the radio network controller (RNC) on the mobile circuit-switched network;

causing the gateway apparatus to connect the packet transfer apparatus to the second gateway apparatus; and causing the gateway apparatus to execute interconnection of voice communication between a terminal connected to the second gateway apparatus and a terminal connected to the mobile high-speed network via the radio network controller (RNC).

Supplementary Note 28

A network system, comprising:
a packet transfer apparatus provided on a mobile high-speed network;
a second gateway apparatus that interconnects a mobile circuit-switched network and an IMS network; and
a gateway apparatus that connects the packet transfer apparatus on the mobile high-speed network to the second gateway apparatus;
wherein the gateway apparatus converts a protocol of the packet transfer apparatus into a protocol identical to a protocol of a radio network controller (RNC), so that it appears to the second gateway apparatus on the mobile circuit-switched network that the packet transfer apparatus on the mobile high-speed network operates in the same way as the radio network controller (RNC) on the mobile circuit-switched network, and connects the packet transfer apparatus to the second gateway apparatus, so as to realize interconnection of voice communication between a terminal connected to the second gateway apparatus and a terminal connected to the mobile high-speed network via the radio network controller (RNC).

What is claimed is:

1. A first gateway apparatus that is connected to a packet transfer apparatus provided on a mobile packet network and is connected to a second gateway apparatus provided on a mobile circuit switched network to perform voice communication therebetween, said first gateway apparatus comprising
a conversion section that includes:
a receiver that receives at least one of a first call control signal and a first packet that has voice data stored therein in a first predetermined protocol or first payload format from said packet transfer apparatus on said mobile packet network;
a transmitter that transmits at least one of a second call control signal and a second packet that has voice data stored therein in a second predetermined protocol or second payload format to said packet transfer apparatus;
an analysis unit that decides whether a conversion of at least one of said first call control signal, and said first predetermined protocol or said first payload format, is necessary, and decides whether a conversion of at least one of a call control signal from said second gateway apparatus into said second call control signal, and a voice signal from said second gateway apparatus into said second packet of a protocol corresponding to said packet transfer apparatus, is necessary; and
a converter that converts at least one of said first call control signal and said first predetermined protocol or said first payload format, when said analysis unit decides that a conversion thereof is necessary, into a protocol being same as a circuit switched protocol which is used when a radio network controller (RNC) on said mobile circuit switched network connects to said second gateway apparatus, for output to said second gateway apparatus, wherein
said converter receives, from said second gateway apparatus, at least one of a call control signal that uses a protocol being same as a protocol which is used when said second gateway apparatus outputs to said RNC, and said voice signal that uses said same protocol, and converts at least one protocol of said call control signal and said voice signal received, for output to said packet transfer apparatus on said mobile packet network,
wherein said second gateway apparatus connected to said RNC interconnects said mobile circuit switched network and an IMS (IP Multimedia Subsystem) network,
wherein said first gateway apparatus and said second gateway apparatus interconnect a first terminal connected to said packet transfer apparatus provided on said mobile packet network and a second terminal connected to said IMS network,
wherein said second gateway apparatus is configured to receive location information about said second terminal to determine whether or not an address of a packet to be transmitted from or received by said second gateway apparatus via said IMS network to or from said second terminal is changed according to movement of said second terminal, said second gateway apparatus controlling to change the address of said packet to be transmitted to or received from said IMS network side for switching of a destination or source route of said packet, when it is determined that the address of said packet to be transmitted to or received from said second terminal via said IMS network is changed according to movement of said second terminal,
wherein said second gateway apparatus is configured to convert a signal from said IMS network to said circuit switched protocol that is used for supply to said RNC provided on said mobile circuit switched network and transfer the converted signal to said first gateway apparatus,
wherein, when said analysis unit decides that no conversion is needed, said converter is configured to receive a circuit switching protocol frame from said second gateway apparatus and to packetize said circuit switching protocol frame into said second packet, while, when said analysis unit decides conversion is necessary, said converter is further configured to, on reception of a conversion instruction on a per channel basis from said analysis unit, convert said circuit switching protocol frame from said second gateway apparatus into a packet format of a protocol corresponding to said packet transfer apparatus, on a per channel basis, according to said conversion instruction,
said transmitter transmitting said second packet to said packet transfer apparatus.

2. The first gateway apparatus according to claim 1, wherein said conversion section further comprises
an audio transcoder unit that converts an audio compression encoding scheme of a voice signal.

3. The first gateway apparatus according to claim 1, wherein said conversion section further comprises
a security processing unit that strengthens a security function in order to exchange a packet with said mobile packet network.

4. The first gateway apparatus according to claim 1, wherein said mobile packet network comprises at least one of LTE (Long Term Evolution), EPC (Evolved Packet Core), Home NodeB, and Home eNodeB.

5. The first gateway apparatus according to claim 1, wherein said second gateway apparatus further comprises
a circuit switching equipment.

6. A gateway method by a first gateway apparatus that is connected to a packet transfer apparatus provided on a mobile packet network and is connected to a second gateway apparatus provided on a mobile circuit-switched network to achieve voice communication therebetween, said method comprising:
receiving at least one of a first call control signal and a first packet that has voice data stored therein in a first predetermined protocol or first payload format from said packet transfer apparatus on said mobile packet network;
transmitting at least one of a second call control signal and a second packet that has voice data stored therein in a second predetermined protocol or second payload format to said packet transfer apparatus;
deciding whether a conversion of at least one said first call control signal, and said predetermined first protocol or said first payload format, is necessary;
deciding whether a conversion of at least one of a call control signal from said second gateway apparatus into said second call control signal, and a voice signal from said second gateway apparatus into said second packet of a protocol corresponding to said packet transfer apparatus, is necessary; and
converting at least one of said first call control signal and said first predetermined protocol or said first payload format, when deciding that a conversion thereof is necessary, into a protocol being same as a circuit switched protocol which is used when a radio network controller (RNC) on said mobile circuit switched network connects to said second gateway apparatus, for output to said second gateway apparatus, said method further comprising:

receiving, from said second gateway apparatus, at least one of a call control signal that uses a protocol being same as a protocol which is used when said second gateway apparatus outputs to said RNC, and said voice signal that uses said same protocol; and
converting at least one protocol of said call control signal and said voice signal received, for output to said packet transfer apparatus on said mobile packet network,
wherein said second gateway apparatus connected to said RNC interconnects said mobile circuit switched network and an IMS (IP Multimedia Subsystem) network,
wherein said first gateway apparatus and said second gateway apparatus interconnect a first terminal connected to said packet transfer apparatus provided on said mobile packet network and a second terminal connected to said IMS network,
wherein said second gateway apparatus is configured to receive location information about said second terminal to determine whether or not an address of a packet to be transmitted from or received by said second gateway apparatus via said IMS network to or from said second terminal is changed according to movement of said second terminal, said second gateway apparatus controlling to change the address of said packet to be transmitted to or received from said IMS network side for switching of a destination or source route of said packet, when it is determined that the address of said packet to be transmitted to or received from said second terminal via said IMS network is changed according to movement of said second terminal,
wherein said second gateway apparatus converts a signal from said IMS network to said circuit switched protocol that is used for supply to said RNC provided on said mobile circuit switched network and transfers the converted signal to said first gateway apparatus,
wherein said method further comprises:
when it is decided by said first gateway apparatus that no conversion is needed, receiving a circuit switching protocol frame from said second gateway apparatus and packetizing said circuit switching protocol frame into said second packet, while,
when it is decided by said first gateway apparatus decides that conversion is necessary, converting said circuit switching protocol frame from said second gateway apparatus into a packet format of a protocol corresponding to said packet transfer apparatus, on a per channel basis; and
transmitting said packet to said second packet transfer apparatus.

7. The gateway method according to claim 6, wherein said second gateway apparatus further comprises
a circuit switching equipment.

8. A communication system, comprising:
a packet transfer apparatus provided on a mobile packet network;
a second gateway apparatus provided on a mobile circuit-switched network; and
a first gateway apparatus that is connected to said packet transfer apparatus and is connected to said second gateway apparatus to achieve voice communication therebetween, wherein said first gateway apparatus comprises a conversion section that includes:
a receiver that receives at least one of a first call control signal and a first packet that has voice data stored therein in a first predetermined protocol or first payload format from said packet transfer apparatus on said mobile packet network;
a transmitter that transmits at least one of a second call control signal and a second packet that has voice data stored therein in a second predetermined protocol or second payload format to said packet transfer apparatus;
an analysis unit that decides whether a conversion of at least one of said first call control signal, and said first predetermined protocol or said first payload format, is necessary, and decides whether a conversion of at least one of a call control signal from said second gateway apparatus into said second call control signal, and a voice signal from said second gateway apparatus into said second packet of a protocol corresponding to said packet transfer apparatus, is necessary; and
a converter that converts at least one of said first call control signal and said first predetermined protocol or said first payload format, when said analysis unit decides that a conversion thereof is necessary, into a protocol being same as a circuit switched protocol which is used when a radio network controller (RNC) on said mobile circuit switched network connects to said second gateway apparatus, for output to said second gateway apparatus, wherein
said converter receives, from said second gateway apparatus, at least one of a call control signal that uses a protocol being same as a protocol which is used when said second gateway apparatus outputs to said RNC, and said voice signal that uses said same protocol, and converts at least one protocol of said call control signal and said voice signal received, for output to said packet transfer apparatus on said mobile packet network,
wherein said second gateway apparatus connected to said RNC interconnects said mobile circuit switched network and an IMS (IP Multimedia Subsystem) network,
wherein said first gateway apparatus and said second gateway apparatus interconnect a first terminal connected to said packet transfer apparatus provided on said mobile packet network and a second terminal connected to said IMS network,
wherein said second gateway apparatus is configured to receive location information about said second terminal to determine whether or not an address of a packet to be transmitted from or received by said second gateway apparatus via said IMS network to or from said second terminal is changed according to movement of said second terminal, said second gateway apparatus controlling to change the address of said packet to be transmitted to or received from said IMS network side for switching of a destination or source route of said packet, when it is determined that the address of said packet to be transmitted to or received from said second terminal via said IMS network is changed according to movement of said second terminal,
wherein, when said analysis unit decides that no conversion is needed, said converter is configured to receive a circuit switching protocol frame from said second gateway apparatus and to packetize said circuit switching protocol frame into said second packet, while, when said analysis unit decides conversion is necessary, said converter is further configured to, on reception of a conversion instruction on a per channel basis from said analysis unit, convert said circuit switching protocol frame from said second gateway apparatus into a packet format of a protocol corresponding to said packet transfer apparatus, on a per channel basis, according to said conversion instruction, said transmitter transmitting said second packet to said packet transfer apparatus.

9. The communication system according to claim 8, wherein said second gateway apparatus further comprises a circuit switching equipment.

10. The gateway method according to claim 6, comprising converting an audio compression-encoding scheme for a voice signal.

11. The gateway method according to claim 6, comprising enhancing a security function for exchange of a packet with said mobile packet network.

12. A second gateway apparatus, wherein said second gateway apparatus is connected to a radio network controller (RNC) and a first gateway apparatus provided on a mobile circuit switched network and connected to an IMS (IP Multimedia Subsystem) network, said first gateway apparatus being connected to a packet transfer apparatus provided on a mobile packet network and configured to perform protocol conversion between said mobile circuit switched network and said mobile packet network, wherein said second gateway apparatus is configured to convert a signal from said IMS network to a circuit switched protocol that is used for supply to said RNC and transfer the converted signal to said RNC and said first gateway apparatus, wherein said second gateway apparatus is configured to convert a signal of said circuit switched protocol from said RNC or said first gateway apparatus to a SIP (Session Initiation Protocol) or SDP (Session Description Protocol) signal and transfer the converted signal to said IMS network, and wherein said second gateway apparatus is configured to receive location information about said second terminal to determine whether or not an address of a packet to be transmitted from or received by said second gateway apparatus via said IMS network to or from said second terminal is changed according to movement of said second terminal, said second gateway apparatus controlling to change the address of said packet to be transmitted to or received from said IMS network side for switching of a destination or source route of said packet, when it is determined that the address of said packet to be transmitted to or received from said IMS network side is changed according to movement of said second terminal.

13. The first gateway apparatus according to claim 1, wherein said second gateway apparatus is configured to hold a sequence number of a last packet transmitted to said IMS network side and to control a sequence number of said packet to be transmitted to said IMS network side to be changed continuously from said last packet, when the address of said packet is changed.

14. The gateway method according to claim 6, wherein said second gateway apparatus is configured to hold a sequence number of a last packet transmitted to said IMS network side and to control a sequence number of said packet to be transmitted to said IMS network side to be changed continuously from said last packet, when the address of said packet is changed.

15. The communication system according to claim 8, wherein said second gateway apparatus is configured to hold a sequence number of a last packet transmitted to said IMS network side and to control a sequence number of said packet to be transmitted to said IMS network side to be changed continuously from said last packet, when the address of said packet is changed.

16. The second gateway apparatus according to claim 12, wherein said second gateway apparatus is configured to hold a sequence number of a last packet transmitted to said IMS network side and to control a sequence number of said packet to be transmitted to said IMS network side to be changed continuously from said last packet, when the address of said packet is changed.

\* \* \* \* \*